US006331677B1

(12) United States Patent
Munakata et al.

(10) Patent No.: US 6,331,677 B1
(45) Date of Patent: Dec. 18, 2001

(54) OVERHEAD WIRE

(75) Inventors: Takeo Munakata; Naoshi Kikuchi; Takashi Shinohara; Hideo Banse; Takao Kaneko; Hiroji Akasaka; Yukikatsu Aida, all of Tokyo; Naoyoshi Shimokura; Yuji Ishikubo, both of Osaka; Tetsuya Okada; Tamezo Suzuki, both of Tokyo, all of (JP)

(73) Assignees: The Furukawa Electric Co., Ltd., Tokyo; The Kansai Electric Power Co., Inc., Osaka, both of (JP)

( * ) Notice: Subject to any disclaimer, the term of this patent is extended or adjusted under 35 U.S.C. 154(b) by 0 days.

(21) Appl. No.: 09/308,625

(22) PCT Filed: Sep. 16, 1998

(86) PCT No.: PCT/JP98/04153

§ 371 Date: Oct. 28, 1999

§ 102(e) Date: Oct. 28, 1999

(87) PCT Pub. No.: WO99/17306

PCT Pub. Date: Apr. 8, 1999

(30) Foreign Application Priority Data

Sep. 29, 1997 (JP) .................................................. 9-263627
Oct. 20, 1997 (JP) .................................................. 9-304832
Mar. 28, 1998 (JP) .................................................. 10-100506

(51) Int. Cl.$^{7}$ ............................. H01B 5/08; H02G 7/14

(52) U.S. Cl. ................................ 174/128.1; 174/128.2; 174/42

(58) Field of Search ............................ 174/128.1, 126.1, 174/128.2, 36, 42, 133 R

(56) References Cited

U.S. PATENT DOCUMENTS 338,913 * 3/1886 Batcherlor .
2,022,839 * 12/1935 Austin .................................... 174/13
3,691,751 * 9/1972 Hiller et al. ........................... 57/144
5,711,143 * 1/1998 Munakata et al. ...................... 57/215
5,808,238 * 9/1998 Munakata et al. ...................... 174/42
6,147,303 * 11/2000 Abe et al. .............................. 174/42

FOREIGN PATENT DOCUMENTS 31-19248 12/1956 (JP) .
61-245409 10/1986 (JP) .

(List continued on next page.)

*Primary Examiner*—Dean A. Reichard
*Assistant Examiner*—William H. Mayo, III
(74) *Attorney, Agent, or Firm*—Arent Fox Kintner Plotkin & Kahn, PLLC

(57) ABSTRACT

An overhead cable includes an outermost surface formed by twisting together a plurality of segment strands. A plurality of spiral grooves form recesses having substantially rectangular cross-sections and are provided at intervals in a circumferential direction of either the outer surface of the segment strands or the outer surface regions of boundary portions where twisted segment strands adjoin each other. Thin segment strands and at least one thick segment strand form the outermost layer. A recessed portion is provided at one side surface among two surfaces of the segment strands forming the outermost layer, a projecting portion is provided at the other side surface, and the strands are twisted together so that the recessed portions and the projecting portions mate. The recessed and projecting portions formed at the two side surfaces of the segment strands mate with each other to form recess-projection mating portions, and the lengths of the contact of the recessed and projecting surfaces at the recess-projection mating portions is configured to be no more than 10% of the length of the recess-projection mating portions.

26 Claims, 24 Drawing Sheets

FOREIGN PATENT DOCUMENTS

| | | |
|---|---|---|
| 63-26979 | 7/1988 | (JP) . |
| 4-101312 | 9/1992 | (JP) . |
| 7-66695 | 7/1995 | (JP) . |
| 8-50814 | 2/1996 | (JP) . |
| 8-77830 | 3/1996 | (JP) . |
| 2508854 | 4/1996 | (JP) . |

* cited by examiner

REDUCTION OF DRAG IN HIGH WIND SPEED REGION

CV1: ■ (1) LP810
CV2: ▲ (2) LNP810
CV3: ○ (3) ACSR810

OVERHEAD WIRE

BACKGROUND OF THE INVENTION

1. Field of the Invention

The present invention relates to an overhead cable designed to reduce the wind load and to an overhead cable designed to reduce the wind load and noise.

2. Description of the Related Art

As an overhead cable of the related art, an overhead cable In which an outermost layer Is formed by twisted segment strands having an approximately trapezoidal cross-section and in which a plurality of spiral grooves are provided at spatial Intervals in a circumferential direction on the outermost layer in order to reduce the wind load is disclosed In the specification of U.S. Pat. No. 5,711,143. However, in the overhead cable disclosed In this U.S. patent specification, since the cross-sectional shape of the spiral grooves is that of an arc, though there is an excellent effect in reducing the wind load when the wind speed is low compared with an overhead cable having a plain and smooth surface where no such measures are taken, the rate of reduction of the drag coefficient (wind load) is not sufficient when the wind speed is a high 30 m/s or more. Therefore, there has been a disadvantage that the effect of reducing wind load has not been sufficient in such a region.

An overhead cable in which thick twisted segment strands are provided between thin segment strands having an approximately trapezoidal cross-section to provide spiral-shaped projections on the surface of the outermost layer in order to reduce noise is disclosed in Japanese Unexamined Patent Publication (Kokai) No. 8-273439. However, though the overhead cable disclosed in this publication has an excellent effect in reducing wind noise etc., the drag coefficient is large and therefore the wind load becomes large. Therefore, there has been a disadvantage that the effect in reducing the wind load has been not sufficient.

Furthermore, according to the results of wind tunnel tests so far, when making the surface of a cable as smooth as possible and providing a plurality of spiral grooves of a certain shape in order to obtain the effect of reduction of the wind load, with a cable of the related art in which the outermost layer is comprised of approximately trapezoidal cross-section segment strands, the preformed twisted strands will spring back due to their residual elasticity making it impossible to obtain a good cable surface. Further, since the sides of the trapezoidal segment strands are straight, the strands slip in the diametrical direction when twisting the segment strands to form the outermost layer and therefore the strands will easily end up sticking out or becoming slack making it impossible to obtain a smooth cable surface and obtain the expected effect of reduction of the wind load.

Also, with a cable in which the outermost layer is formed by thin and thick twisted segment strands as explained above, when the cable is passed through a plurality of pulleys for laying out on steel towers, it is repeatedly bent and as a result the segment strands forming the outermost layer slip and end up sticking out or becoming slack causing the problem of an impairment of the effect of reduction of the wind load.

Furthermore, while the twisted cable of the related art was formed by twisting together differently shaped strands which were respectively drawn in advance and shaped by rolling right before being twisted and then pressing the assembly from the outside by a die etc. to shape it. Since there was nothing controlling the positions of the strands after being passed through the die etc., sometimes step differences arose between strands or the strands would become slanted thereby having an unfavorable effect on the cable characteristics and leading to fluctuations in the outer diameter.

European Patent Publication No. 0379853 discloses an overhead cable formed by twisting together segment strands wherein the segments forming the outermost layer are given an approximate S-shaped cross-section. However, this overhead cable is configured with a projecting portion provided at a side of one segment strand of two adjacent segment strands joined with a notched portion provided on the facing side of the other segment strand, therefore while the freedom of movement is restricted to some extent compared with a straight side, there were the problems at the time of laying the cable that the surface of the cable would still easily deform, the segment strands would slip and end up sticking out or becoming slack, and the effect of reduction of the wind load would be impaired. Further, with the overhead cable disclosed in this publication, there was the problem that the wind noise became considerably strong because the surface of the outermost layer was smooth.

Further, in the above overhead cables of the related art, since there was a large length of contact at the adjoining contact portions of the segment strands, there were the problems of a large contact friction, poor flexibility and therefore difficult handling resulting in excessive stress applied to the strands in the process of twisting and drawing and thereby causing linear scratches, burrs, and the like.

BRIEF SUMMARY OF THE INVENTION

An object of the present invention is to provide an overhead cable which can reduce the wind load or can reduce the wind load and wind noise.

Another object of the present invention is to provide an overhead cable which reduces the wind load or reduces the wind load, wind noise, and corona noise by preventing slippage of the outermost layer of segment strands in the diametrical direction of the cable and the resultant sticking out or slackness of the strands at the time of twisting or passage of the overhead cable through on the pulleys.

Still another object of the present invention is to provide an overhead cable which reduces the wind load or reduces both the wind load and wind noise by making the length of contact at the adjoining contact portions of the twisted segment strands less than a predetermined length to make the cable pliable, by preventing slippage of the twisted strands in the cable diametrical direction at the time of twisting or passage of the overhead cable through on the pulleys, and thereby preventing the strands from sticking out or becoming slack.

Namely, the overhead cable of a first aspect according to the present invention is an overhead cable comprising a tension-bearing core; a conductive layer provided at the outer circumference of said core; and an outermost layer formed by twisting together a plurality of segment strands at the outer circumference of said conductive layer, characterized in that provision is made at a part of an outer circumferential surface of said segment strands or outer circumferential surface regions of boundary portions where said segment strands are twisted together and adjoin each other a plurality of spiral grooves forming recesses having bottom portions with rectangular cross-sections at intervals in the circumferential direction of the overhead cable.

According to the overhead cable according to the first aspect of the present invention, by making the cross-sectional shape of the bottom of the spiral grooves rectangular, an overhead cable with a superior effect of reduction of the wind load can be obtained.

Preferably, in the above invention, when the width of the spiral grooves having a bottom portion with a rectangular cross-section is W and the depth is h, it is possible to adopt a configuration satisfying $1<W/h<16$.

Also, by making the above W and h satisfy $1<W/h<16$, an overhead cable having a more superior effect of reduction of the wind load can be obtained.

As a preferred mode of the overhead cable according to the above first aspect, it is possible to adopt a configuration providing two edge portions of the spiral grooves with chamfers of a gradient of 10% or less or chamfers of a radius of curvature of D/2 or less (where D is a diameter of the overhead cable).

According to the above mode, by giving the two edge portions of the spiral groove to a chamfer of a gradient of not more than 10% or a chamfer of a radius of curvature of not more than D/2 (where D is the diameter of the overhead cable), the turbulence in the spiral grooves becomes further stronger and a further reduction of the wind load can be expected. Namely, by giving the two edge portions of the spiral groove a chamfer of a gradient of not more than 10% or a chamfer of a radius of curvature of not more than D/2 (where D is the diameter of the overhead cable), the air flowing along the cable surface actively flows into the grooves and is made turbulent inside the grooves over a wide range of wind speed. As a result, the return point of the turbulent boundary layer can be shifted downwind and the effect of reduction of the wind load can be further enhanced.

As other embodiments of the overhead cable according to the above first aspect, it is possible to adopt a configuration where the conductive layer is comprised of not only one layer, but a plurality of layers or possible to adopt one where the conductive layer is comprised of a plurality of segment strands twisted together and the segment strands have circular cross-sections or sectoral cross-sections.

According to the above mode, by using strands having a sectoral cross-section, the path area as a conductive layer can be efficiently secured and the cable diameter as a whole can be made smaller.

The overhead cable according to the second aspect of the present invention is an overhead cable comprising a tension-bearing core; a conductive layer formed at the outer circumference of said core; and an outermost layer formed by twisting together a plurality of segment strands at an outer circumference of said conductive layer, as the segment strands forming the outermost layer, use being made of thin segment strands and at least one thick segment strand and the following being satisfied $0.01<H/D<0.10$ and $10°<\theta<90°$ where a step difference between said thin segment strands and said thick segment strands is H, a center angle of said thick segment strands is θ, and an outer diameter of the overhead cable formed by said thin segment strands is D.

According to the overhead cable. according to the above second aspect, an overhead cable superior in reducing noise can be obtained. Namely, when H/D is not more than 0.01 at a portion projecting from the outermost layer, the step difference H is too small to generate an effect of disturbing the karman vortex caused by the wind, so the effect of reduction of the wind noise cannot be attained. On the other hand, when H/D is 0.10 or more, the step difference is too large so that even though the wind noise can be prevented, there arises a disadvantage that the projected cross-sectional area increases and the wind load increases proportionally to the increase of the projected cross-sectional area. Also, with a cable having such a high step difference, there is a problem that a larger wind load is generated than in conventional cables when the wind blows in a slantwise direction with respect to the cable axis direction. Therefore, the value of H/D is preferably selected within the range of $0.01<H/D<0.10$. Furthermore, when H/D is too large, the electric field intensifies at the step difference portion and causes larger corona noise, so the value of H/D is preferably within the range of $0.01<H/D<0.10$.

When the center angle θ is 10° or less, a karman vortex is formed at the downwind side of the cable. As a result, in addition to a decline in the effect of reduction of the wind noise, there is a problem that the thick segment strands are crushed or deformed when passing through a pulley. On the other hand, when the angle θ is 90° or more, the projected cross-sectional area is increased and the wind load is increased. Therefore, the value of the center angle θ is preferably selected within the range of $0°<\theta<90°$.

As other mode of the overhead cable according to the above second aspect, it is possible to adopt a configuration providing at a part of a surface of said segment strands or outer circumferential surface regions of boundary portions where said segment strands are twisted together and adjoin each other a plurality of spiral grooves forming recesses having bottom portions with rectangular cross-sections at intervals in the circumferential direction of the overhead cable or possible to adopt a configuration forming said spiral grooves to satisfy $1<W/h<16$ where a width and a depth of said cross-section are W and h.

According to the above mode, an overhead cable superior not only in reducing the wind noise but also the effect of reduction of the wind load can be obtained.

As other mode of the overhead cable according to the above second aspect, it is possible to adopt a configuration provide at the two edge portions of the spiral grooves forming recesses having bottom portions with rectangular cross-sections a chamfer of a gradient of 10% or less or a chamfer of a radius of curvature of D/2 or less (where D is the diameter of said overhead cable), possible to adopt a configuration where said conductive layer is comprised of not just one layer, but a plurality of layers, or possible to adopt a configuration forming the conductive layer by twisting together a plurality of segment strands and using segment strands having circular cross-sections or sectoral cross-sections.

The overhead cable according to the third aspect of the present invention is an overhead cable comprising a tension-bearing core; a conductive layer provided at an outer circumference of said core; and an outermost layer formed by twisting a plurality of segment strands at an outer circumference of said conductive layer, characterized in that each of said plurality of segment strands is provided with a recessed portion at one side surface among a pair of side surfaces facing each other in a circumferential direction of the overhead cable and is provided with a projecting portion at the other side surface so as to mate with an adjacent segment strand in the state when twisted to form the outermost layer.

According to the overhead cable according to the above third aspect, by forming the twisted segment strand layer (outermost layer) by fitting together a recessed portion of one strand of two adjoining segment strands and a projecting portion of the other strand to engage the two, slippage and movement of the adjacent segment strands in the cable diametrical direction can be prevented. Therefore, since the segment strands do not slip in the cable diametrical direction when twisting together the segment strands to form the outermost layer, the strands do not end up sticking out or becoming slack. Also, since the segment strands do not slip in the cable diametrical direction when the cable is passed through pulleys when laying the cable, the strands do not end up sticking out then either.

As another mode of the overhead cable according to the above third aspect, it is possible to adopt a configuration forming at an outer circumferential surface of said segment strands or outer circumferential surface regions of boundary portions where said segment strands adjoin each other at least one or a plurality of spiral grooves with recessed cross-sections formed at intervals in the circumferential direction of the overhead cable.

According to the above mode, by providing recessed spiral grooves on the outer circumferential surface of the twisted segment strand layer (outermost layer), the wind load can be reduced when the wind blows on the overhead cable.

As another mode of the overhead cable according to the above third aspect, it is possible to adopt a configuration where the distance G from a center portion P of a bottom of the recessed portion and a center portion Q of a top of said projecting portion provided at the two side surfaces of the segment strands to a bottom surface (inner circumferential surface) of said segment strand layer (outermost layer) satisfies $0.2T \leqq G \leqq 0.8T$ (mm) with respect to a thickness T between the bottom surface and outer circumferential surface.

According to the above mode, there is a great effect of preventing the segment strands from sticking out or becoming slack due to slippage in the cable diametrical direction when twisting together the segment strands to form the outermost layer.

As another mode of the overhead cable according to the above third aspect, it is possible to adopt a configuration providing a space of 0.1 to 1.0 mm at least at one location of boundary portions where a plurality of segment strands are twisted together to adjoin each other.

According to the above mode, by providing a space of 0.1 to 1.0 mm at least at one location of adjoining portions of the segment strands in the outermost layer, even if there is error in the dimensions of the segment strands, there will be no overlayer and the strands will not stick up or becoming slack. If there is error in the dimensions of the segment strands when twisting together the segment strands to form the outermost layer, for example, if the width of the segment strands is larger than a predetermined dimension, an overlayer occurs and the outer layer segment strands are twisted together in a "floating" state not in close contact with the twisted strands of the inner layer conductive layer. If lateral pressure is applied from the cable outer circumference, the segment strands will be deformed inward. As a result, a smooth outer circumferential surface will not be formed, a bumpy surface will end up being created, and strands will end up sticking out or becoming slack, but if the space g is provided between the adjacent segment strands as explained above, even if there is some error in the dimensions of the segment strands when making the projecting portions of adjacent twisted strands mate with the recessed portions of the adjacent strands and twisting the segment strands together, the error can be absorbed and adjusted by the space g, so recessed portions and projecting portions can be reliably mated, no overlayer occurs, the twisting process becomes easy, segment strands are prevented from sticking out or becoming slack, a smooth outer surface can be formed, and a reliable effect of reduction of the wind load can be obtained. Further, due to this space g, rain water entering into the cable can be quickly discharged.

To obtain the effect of reduction of the wind load, it is necessary to form the outer circumferential surface of the cable as a smooth outer circumferential surface and not to form any harmful spaces. Therefore, as explained above, the segment strands twisted at the outermost layer have recessed portions and projecting portions mated with each other to prevent slippage at the time of twisting and a predetermined space g is provided at least at one location of adjacent portions of segment strands twisted at the outermost layer, whereby a smooth outer surface is formed at the cable outer circumferential surface.

As another mode of the overhead cable according to the above third aspect, it is possible to adopt a configuration where the relationship between the depth a of the spiral grooves formed in outer circumferential surface of the twisted segment strand layer (outermost layer) and the width b at an opening portion satisfies $0.05 \leqq a/b \leqq 0.5$.

According to the above mode, by making the depth a and the width b of the spiral grooves formed in the outer circumferential surface of the twisted segment strand layer $0.05 \leqq a/b \leqq 0.5$, an optimal drag coefficient Cd can be selected with respect to the desired design wind speed required and the effect of reduction of the wind load can be increased. The above width b of the groove is generally 2 to 10 mm, preferably 5 to 7 mm, and the depth a of the groove is 0.25 to 0.35 mm or more.

According to the another mode of the overhead cable according to the above third aspect, it is possible to adopt a configuration using thin segment strands and at least one thick segment strand as said segment strands forming said outermost layer and satisfying $0.01<H/D<0.10$ and $10° < \theta < 90°$ where a step difference of the thin segment strands and the thick segment strands is H, a center angle of said thick segment strands is θ, and an outer diameter of the overhead cable formed by the thin segment strands is D.

According to the above mode, spiral projections projecting out from the outer circumferential surface of the cable are formed by the thick segment strands. The spiral projections disturb the karman vortex caused by the wind and reduce the wind noise. By selecting the step difference H between the outer circumferential surface of twisted layer of the thin segment strands and the outer circumferential surface of the thick segment strands so that the ratio with the outer diameter D of the twisted layer of the thin segment strands becomes within the range of $0.01<H/D<0.10$, the wind load resistance is reduced and a large effect of reduction of the wind load is obtained. When the step difference H is too small, the action of disturbing the karman vortex caused by the wind disappears and the effect of reduction of the noise is lost. When the step difference H is too large, the drag coefficient becomes high and the wind load resistance becomes great, so the effect of reduction of the wind load is impaired. Furthermore, when the step difference H is too large, the electric field intensifies at the step difference portion and corona noise is easily generated. Therefore, the step difference H is selected so that H/D becomes in the range of 0.01 to 0.10.

By selecting the center angle θ of the thick segment strands twisted among the thin segment strand layer at the outermost layer to be within the range of $10° < \theta < 90°$, a large effect of reduction of the wind load and effect of reduction of the noise is obtained and the thick segment strands will not be knocked over or the projections will not be crushed or deformed when the cable is passed through pulleys when laying the cable. When the center angle θ is less than 10°, a karman vortex easily forms in the downwind side of the cable and the effect of reduction of noise is impaired. Further, when passing the cable through pulleys when laying the cable, the thick segment strands twisted on the outermost layer projecting out from the circumferential surface of the cable in a spiral shape will be knocked over or the projections will be crushed or deformed. When the center angle θ exceeds 90°, the projected cross-sectional area increases so the wind load resistance increases and the effect of reduction of the wind load is impaired.

As other mode of the overhead cable according to the above third aspect, it is possible to adopt a configuration wherein said conductive layer is comprised of not just one layer, but a plurality of layers or possible to adopt a configuration forming the conductive layer by twisting a plurality of segment strands together and using segment strands which have circular cross-sections or sectoral cross-sections.

According to the above mode, in particular by using strands having a sectoral cross-section, the path area as a conductive layer can be efficiently secured and the diameter of the cable as a whole can be made smaller.

The overhead cable according to the fourth aspect of the present invention is an overhead cable comprising a tension-bearing core; a conductive layer provided at an outer circumference of said core; and an outermost layer formed by twisting together a plurality of segment strands at an outer circumference of said conductive layer, characterized in that each of said plurality of segment strands is provided with a recessed portion at one side surface among a pair of side surfaces facing each other in a circumferential direction of the overhead cable and is provided with a projecting portion at the other side surface so as to mate with an adjacent segment strand in the state where the strains are twisted together to form the outermost layer state, the recessed portions of the side surfaces of one of the segment strands among adjoining segment strands and the projecting portions of the side surfaces of the other of the segment strands are made to mate to form a plurality of recess-projection mating portions, and a length of contact U in an overhead cable diametrical direction of recessed and projecting surfaces of at least one recess-projection mating portion among the plurality of recess-projection mating portions is made not more than 10% of an entire length W1 of the recessed and projecting surfaces of said recess-projection mating portion in said diametrical direction.

According to the overhead cable according to the above fourth aspect, by forming the twisted segment strand layer (outermost layer) by making the recessed portions of one of the segment strands of adjacent segment strands of the twisted segment strand layer mate with the projecting portions of the other strand, the slippage and movement between adjacent strands in the cable diametrical direction can be prevented. Therefore, when twisting segment strands to form the outermost layer, the segment strands will not slip in the cable diametrical direction, so the strands can be kept from sticking out or becoming slack and fluctuations in the cable outer diameter are eliminated. Also, when passing the cable through pulleys when laying the cable, since the strands do not slip in the cable diametrical direction, the strains will not end up sticking out or becoming slack.

Also, by making the length of contact U of the recessed and projecting surfaces of at least one recessed-projection mating portion in the cable diametrical direction not more than 10% of the entire length W1 of the recessed and projecting surfaces of the recess-projection mating portion in the cable diametrical direction, the friction between the segment strands adjacent to each other at the twisted segment strand layer (outermost layer) becomes small, the twisted strands become flexible, excessive stress is not applied to the segment strands, and linear scratches, burrs and the like are not caused as in conventional cables.

As an mode of the overhead cable according to the fourth aspect, it is possible to adopt a configuration forming at a part of an outer circumferential surface of said segment strands or outer circumferential surface regions of boundary portions where said segment strands are twisted together and adjoin each other at least one or a plurality of spiral grooves with recessed cross-sections formed at intervals in the circumferential direction of the overhead cable.

According to the above mode, by providing the spiral grooves on the outer circumferential surface of the twisted segment strand layer, the wind load is reduced when the wind blows against the overhead cable. When the wind blows from the side onto the overhead cable, the air flow forms a thin boundary layer along the cable surface and flows on the cable surface toward the downwind side. The air flow is mixed inside the arc surface grooves to make the turbulence stronger, and the air flow once breaking away from the cable surface again returns to the cable surface at the rear and then breaks away from the cable surface at the downwind side. As a result of the breakaway point of the boundary layer shifting to the rear of the cable surface in this way, the wake wind at the downwind side of the cable becomes small and the wind load resistance is reduced. As opposed to this, in a conventional cable with no such recessed portions in the cable surface, the broken away air flow flows away without returning again, so the wake wind at the downwind side of the cable becomes large and the wind load resistance is not reduced. As a cross-sectional shape of the spiral grooves, it is possible to use one with a bottom portion with a rectangular or semi-circular shape.

As another mode according to the above fourth aspect, it is possible to adopt a configuration forming the top of the projecting portion and the bottom of the recessed portion, provided at the two sides of the segment strands, to a top arc surface portion forming an arc surface of a radius of curvature R1 and to a bottom arc surface portion forming an arc surface of a radius of curvature R2 and making the radius of curvature R1 of the top arc surface portion and the radius of curvature R2 of the bottom arc surface portion satisfy R1>R2.

According to the above mode, by making the radius of curvature of the top surface of the projecting portion larger than the radius of curvature of the bottom surface of the recessed portion, the length of contact U of the recessed and projecting surfaces of the recess-projection mating portion of adjacent segment strands in the cable diametrical direction can be suppressed to not more than 10% of the entire length W1 of the recess-projection mating portion in the cable diametrical direction.

As another mode of the overhead cable according to the above fourth aspect, it is possible to adopt a configuration forming the top of the projecting portion and the bottom of the recessed portion, provided at the two sides of the segment strands, to a top arc surface portion forming an arc surface of a radius of curvature R3 and to a bottom arc surface portion forming an arc surface of a radius of curvature R4 and making the radius of curvature R3 of the top arc surface portion and the radius of curvature R4 of the bottom arc surface portion satisfy R3<R4.

According to the above mode, by making the radius of curvature of the top surface of the projecting portion smaller than the radius of curvature of the bottom surface of the recessed portion, the length of contact U of the recessed and projecting surfaces of the recess-projection mating portion of adjacent segment strands in the cable diametrical direction can be suppressed to not more than 10% of the entire length W1 of the recess-projection mating portion in the cable diametrical direction. Further, the top arc surface portion of the projecting portion is positioned at the approximate center portion of the bottom arc surface portion of the recessed portion, so it is possible to prevent the twisted segment strands from slipping in the cable diametrical direction.

As another mode of the overhead cable according to the above fourth aspect, it is possible to adopt a configuration where a distance G from a center portion P of said bottom arc surface portion of a recessed portion and a center portion Q of said top arc surface portion of a protecting portion, provided at the two side surfaces of the segment strands, satisfies $0.2T \leqq G \leqq 0.8T$ (mm) with respect to a thickness T between the bottom surface and outer circumferential surface.

According to the above mode, the effect of preventing the strands from sticking out or becoming slack due to the strands slipping in the cable diametrical direction when twisting the segment strands to form outermost layer becomes larger.

As another mode of the overhead cable according to the above fourth aspect, it is possible to adopt a configuration providing a space of 0.1 to 1.0 mm at least at one location of a boundary portion where a plurality of segment strands are twisted together to adjoin each other.

According to the above mode, even if there is some error in the dimensions of the segment strands, no overlayer is caused, the strands do not stick out or become slack, and an effect of reduction of the wind load the same as the above can be obtained.

As another mode of the overhead cable according to the above fourth aspect, it is possible to adopt a configuration forming spiral grooves with recessed cross-sections in an outer circumferential surface of the twisted segment strand layer and making the depth a and the width b of the spiral grooves satisfy $0.05 \leqq a/b \leqq 0.5$.

According to the above mode, by making the depth a and the width b of the spiral grooves formed in the outer circumferential surface of the twisted segment strand layer satisfy $0.05 \leqq a/b \leqq 0.5$, an effect of reduction of the wind load as same as the above can be obtained.

As another mode of the overhead cable according to the fourth aspect, it is possible to adopt a configuration using thin segment strands and at least one thick segment strand as said segment strands forming said outermost layer and satisfying $0.01<H/D<0.10$ and $10°<\theta<90°$ where a step difference of the thin segment strands and the thick segment strands is H, a center angle of said thick segment strands is $\theta$, and an outer diameter of the overhead cable formed by the thin segment strands is D.

According to the above mode, an effect of reduction of the wind load and an effect of reduction of the noise the same as the above can be obtained.

As other mode of the overhead cable according to the above fourth aspect, it is possible to adopt a configuration where the conductive layer is comprised of not only one layer, but a plurality of layers or possible to adopt one where the conductive layer is comprised of a plurality of segment strands twisted together and the segment strands have circular cross-sections or sectoral cross-sections.

According to the above mode, by using strands having a sectoral cross-section, the path area as a conductive layer can be efficiently secured and the cable diameter as a whole can be made smaller.

DETAILED DESCRIPTION OF THE INVENTION

Below, preferred embodiments of the overhead cable according to first and second aspects of the present invention will be explained with reference to the drawings.

Figure 1:
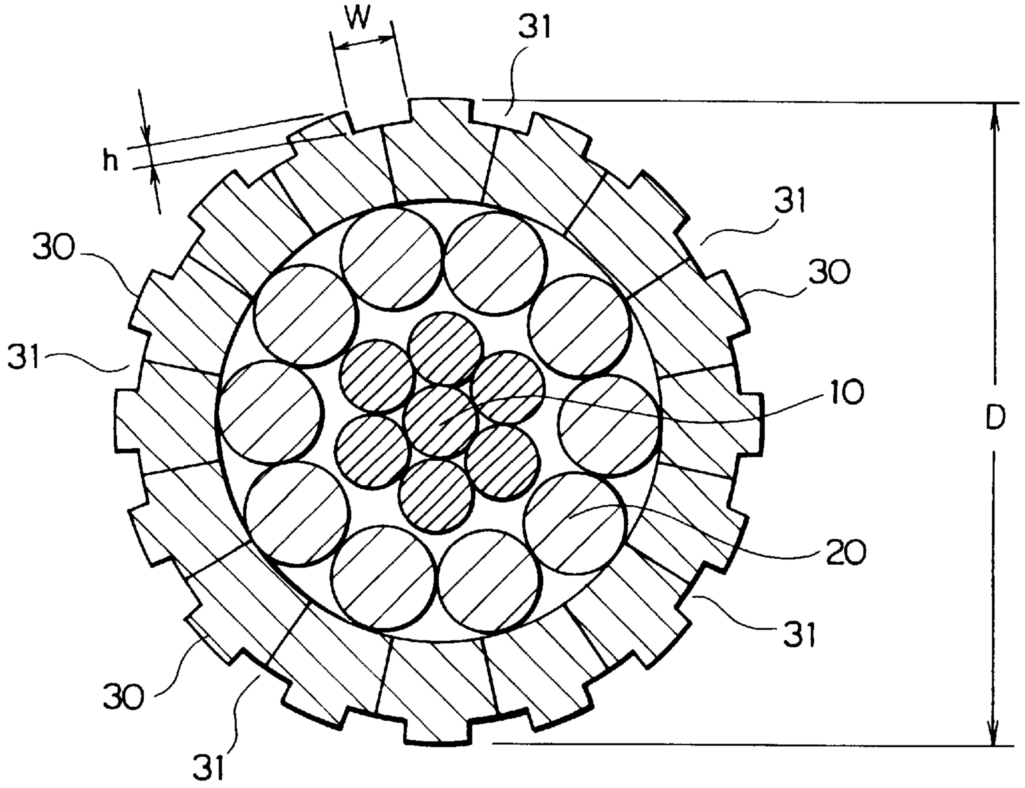
FIG. 1 is a cross-sectional view of an embodiment of the overhead cable according to the present invention.

FIG. 1 is a cross-sectional view of an embodiment of an overhead cable according to a first aspect of the present invention. This overhead cable is formed by twisting around the outer circumference of seven steel core strands 10 serving as a core partially bearing the tension 10 aluminum strands 20 having a circular cross-section serving as a conductive layer and further twisting around that outer circumference 16 segment strands 30 having a sectoral cross-section serving as the outermost layer. Grooves of a step difference h are provided at the two shoulders of the segment strands 30. Two segment strands 30 adjoin each other to form a spiral groove 31 forming a recess with a bottom portion having a rectangular cross-section. Sixteen of these spiral grooves 31 are formed in the circumferential direction. Also, when the width is W and the depth is h, this spiral groove 31 is preferably is formed within the range of $1<W/h<16$.

Figure 2:
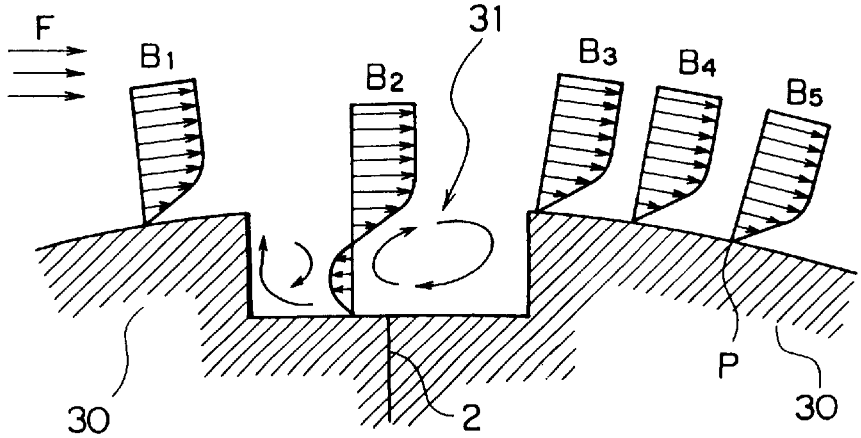
FIG. 2 is an explanatory view for explaining reduction of a wind load of an overhead cable according to the present invention.

Namely, as shown in FIG. 2, when wind F strikes against the overhead cable having the spiral grooves 31 forming recesses with bottom portions having a rectangular cross-section, the wind forms a thin boundary layer B along with outer circumferential surface of the segment strands. The boundary layer B1 is strongly disturbed and made turbulent in the spiral grooves 31 when passing through the grooves and becomes a boundary layer B2. When passing over the downwind side edge portion, a boundary layer B3 breaks away once, then a boundary layer B4 returns to the outer circumferential surface of the segment strands, then a boundary layer B5 breaks away from the outer circumferential surface of the segment strands. Due to this, the breakaway point P where the boundary layer B5 breaks away from the outer circumferential surface of the segment strands 30 can be shifted to the rear of the segment strands, so an overhead cable superior in reducing the wind load can be obtained. In particular, in the present invention provided with spiral grooves 31 with bottoms forming rectangular cross-sections, the disturbance is accelerated due to vibration of the vortex in the grooves, the boundary layer breaks away once, then returns to the outer circumferential surface of the segment strands again, then breaks away from the outer circumferential surface of the segment strands, so the breakaway point P can be shifted to the rear of the segment strands.

Further, in the present invention, as a preferable embodiment, $1<W/h<16$ is adopted because if W/h is 1 or less, the boundary layer sometimes passes through the grooves without being disturbed in the grooves and the reduction of the wind load becomes weaker, while if W/h is 16 or more, the turbulence due to the vortexes generated at the two corners in the groove is lowered and characteristics close to those of a cable having a smooth curvature end up being obtained. Namely. by providing grooves having an approximately rectangular cross-section satisfying $1<W/h<16$, the turbulence of the flow is promoted and a sufficient reduction of the wind load can be obtained.

Table 1 shows sizes when forming spiral grooves forming recesses with bottom portions having rectangular cross-sections in typical overhead cables. According to the dimensions of the grooves, the ability to expect an effect of reduction of the wind load can be confirmed by experiments.

TABLE 1

| Size ($mm^2$) | D (mm) | h (mm) | W (mm) | W/h |
|---|---|---|---|---|
| ACSR160 | 18.2 | 0.2 to 0.5 | 0.2 to 3.0 | 1 to 15 |
| ACSR240 | 22.4 | 0.2 to 0.5 | 0.2 to 3.0 | 1 to 15 |
| ACSR330 | 25.2 | 0.3 to 0.6 | 0.3 to 3.0 | 1 to 10 |
| ACSR410 | 28.5 | 0.3 to 0.8 | 0.3 to 4.0 | 1 to 13 |
| ACSR810 | 38.4 | 0.3 to 1.0 | 0.3 to 4.0 | 1 to 13 |
| ACSR1160 | 46.2 | 0.5 to 2.0 | 0.5 to 6.0 | 1 to 12 |
| ACSR1520 | 52.8 | 0.5 to 2.0 | 0.5 to 6.0 | 1 to 12 |

Figure 3:
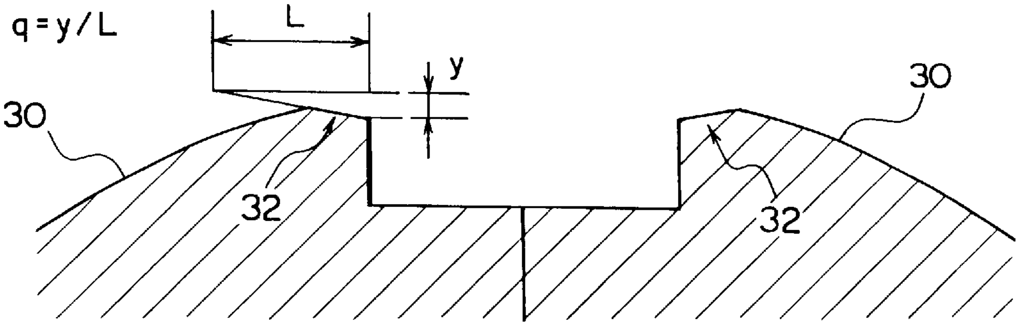
FIG. 3 is an enlarged view of important portions in FIG. 1.

As shown in FIG. 3, the two edge portions 32 of the spiral groove 31 are preferably given chamfers. The size of the chamfers is preferably made a chamfer of a gradient of 10% or less ($q=y/L=10\%$ or less) or a chamfer of radius of curvature of D/2 or less (where D is the diameter of the overhead cable). By providing such chamfers, the disturbance in the spiral groove 31 becomes much larger and a further reduction of the wind load can be expected.

As explained above, by giving a chamfer of a gradient of 10% or less or a chamfer of a radius of curvature of D/2 or less (where D is the diameter of the overhead cable) to the two edge portions 32 of the spiral groove 31, the air flowing along the surface of the cable actively flows into the grooves, turbulence is promoted in the grooves over the wide range of wind speeds, and, as a result, it is possible to shift the return point of the turbulent boundary layer to the rear and further enhance the effect of reduction of the wind load. Accordingly, the magnitude of the chamfering is preferably made a chamfer of a gradient of 10% or less ($q=y/L=10\%$ or less) or a chamfer of a radius of curvature of D/2 or less (where D is the diameter of the overhead cable).

Figure 4:
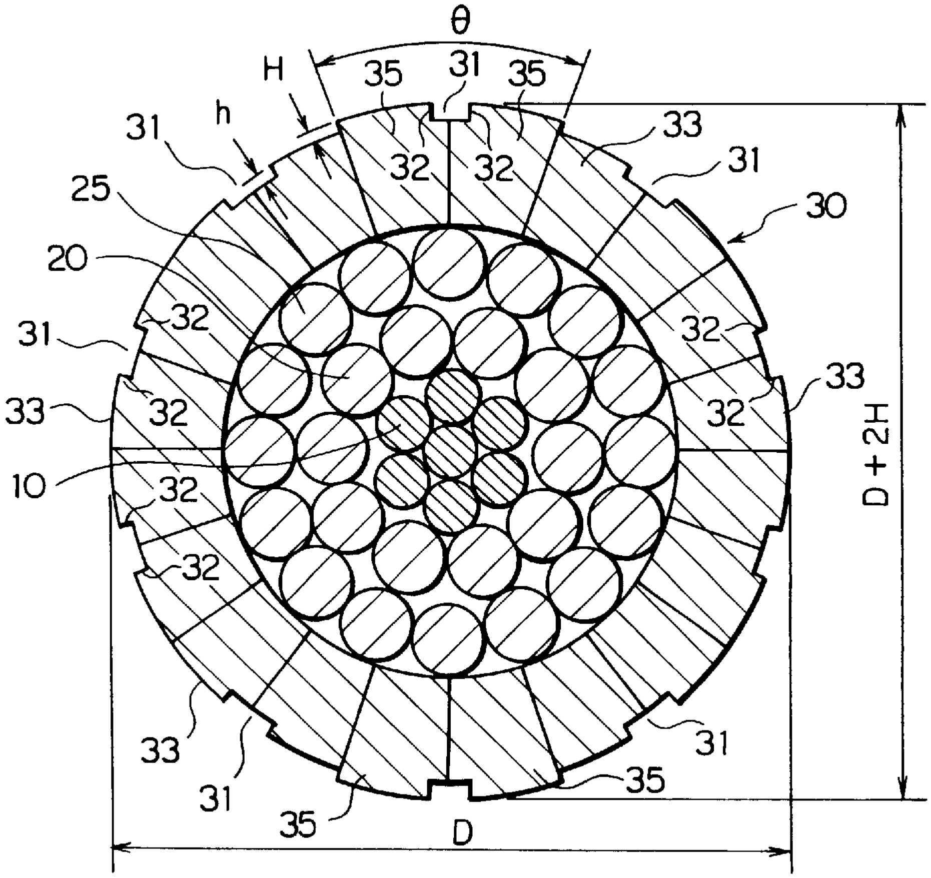
FIG. 4 is a cross-sectional view of another embodiment of the overhead cable according to the present invention.
Figure 5:
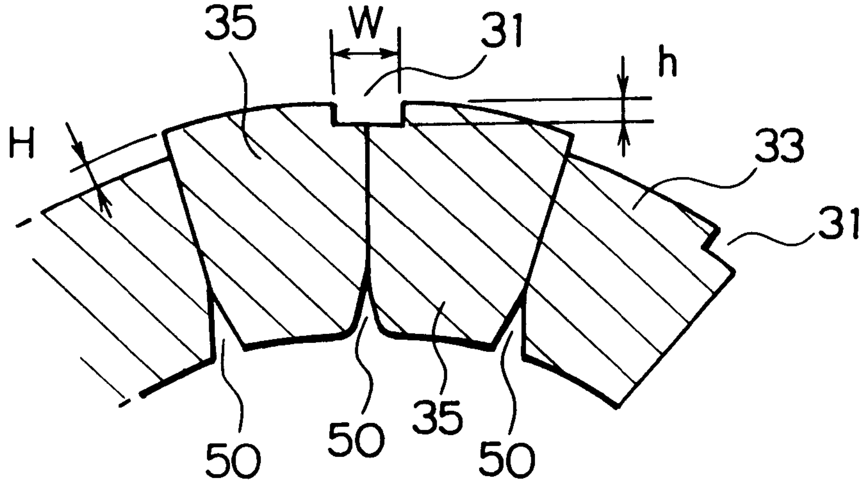
FIG. 5 is an enlarged view of the important portions of FIG. 4.

FIGS. 4 and 5 show an embodiment of the overhead cable according to the first and second aspects of the present invention, wherein thin segment strands 33 and thick segment strands 35 are used as segment strands 30 forming the outermost layer. Namely, this overhead cable is formed by twisting around the outer circumference of seven steel core strands 10 serving as a core partially bearing the tension 10 aluminum strands 20 having a circular cross-section serving as a first conductive layer, further twisting around that outer circumference 16 aluminum strands 25 having a circular cross-section serving as a second conductive layer, and further twisting around that outer circumference 16 thin segment strands 33 and four thick segment strands 35 serving as the outermost layer. The four thick segment strands 35 form two pairs arranged at 180° facing positions.

At one shoulder of each of the segment strands 33 and 35 is provided a groove of step difference (depth) h. Two segment strands provided with the grooves of the step difference h adjoin each other to form a spiral groove 31 forming a single bottom portion having a rectangular cross-section. Ten of these spiral grooves 31 are formed in the circumferential direction. When the width is W and the depth is h, this spiral groove 31 is formed within the range of $1<W/h<16$.

Further, the two edge portions 32 of the spiral groove 31 are preferably provided with a chamber of a gradient of 10% or less ($q=y/L=10\%$ or less) or a chamfer of a radius of curvature of D/2 or less (where D is the diameter of the overhead cable).

In the present invention, when the step difference between the thin segment strands 33 and the thick segment strand 35 is H, the center angle of the thick segment strands 35 is θ, and the outer diameter of the thin segment strands 33 is D, $0.02<H/D<0.14$ and $10°<\theta<90°$ are satisfied.

Namely, when the step difference H between the thin segment strands 33 and the thick segment strands 35 is too small, the effect of reduction of the noise is impaired, while when too large, the drag coefficient becomes high and the effect of reduction of the wind load is impaired. That is, when H/D (D: outer diameter of the thin segment strands) is 0.01 or less, the effect of disturbance by the karman vortex generated by the wind is reduced and the effect of reduction of the noise becomes weaker, while when H/D is 0.10 or more, while the wind noise can be prevented, there is a disadvantage that the step difference becomes too high, the projected cross-sectional area is increased, and the wind load increases in proportion to this. Further, with a cable having such a high step difference, there is a problem that when struck by wind from a slanting direction with respect to the cable axial direction, a larger wind load is generated than the cable of the related art. Therefore, the value of H/D is preferably selected within the range of $0.01<H/D<0.10$.

When the range of θ is 10° or less, a karman vortex is apt to be formed on the downwind side of the cable and not only is the effect of reduction of the noise impaired, but also the thick segment strands are easily crashed or deformed when the cable is passed through pulleys etc. On the other hand, when 90° or more, the projected cross-sectional area increases, the drag coefficient becomes high, and the effect of reduction of the wind load is impaired. Accordingly, the value of the center angle θ should be selected within the range of $10°<\theta<90°$. By configuring the cable as above, the corona noise can also be kept at a sufficiently low level.

Note that, as shown in FIG. 5, a space 50 is provided inside the adjacent portions of the segments 33 and 35. This space 50 is for enabling rain water entering into the cable to quickly be discharged and for adjusting the cross-sectional area of the cable.

Figure 6:
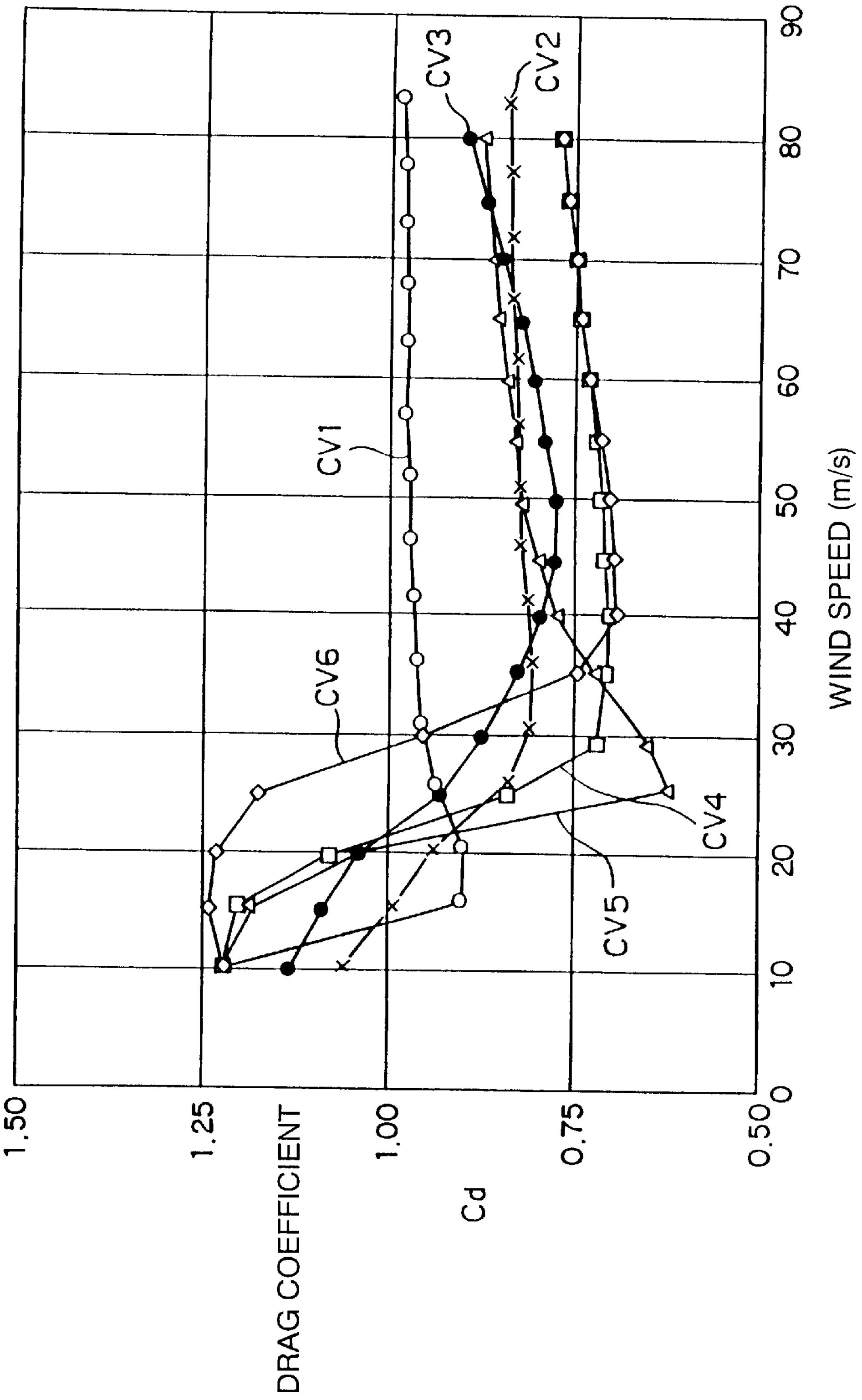
FIG. 6 is a graph of the relationship of the wind speed and the drag coefficient.

FIG. 6 shows the results of a wind tunnel test studying the characteristic of drag reduction for overhead cables of a variety of structures. The abscissa indicates the wind speed (m/s), while the ordinate indicates the drag coefficient Cd. Note that the wind speed (m/s) was measured up to 80 m/s taking into consideration the strong winds at the time of hurricanes. As the overhead cables, the following overhead cables were used.

(1) Cable of related art: Outer diameter 38.4 mm, smooth surface, no grooves

(2) Cable of present invention: Outer diameter 38.4 mm, groove dimensions 2W×1h (mm), step difference 2 mm, center angle θ 45° two diagonal locations, 18 grooves

(3) Cable of present invention: Outer diameter 38.4 mm, groove dimensions 2W×0.3h (mm), step difference 1.4 mm, center angle θ 54° two diagonal locations, 18 grooves

(4) Cable of present invention: Outer diameter 36.6 mm, groove dimensions 2W×1h (mm), no step difference, no center angle, 12 grooves

(5) Cable of present invention: Outer diameter 36.6 mm, groove dimensions 4.4W×0.3h (mm), no step difference, no center angle, 28 grooves

(6) Cable of present invention: Outer diameter 36.6 mm, groove dimensions 3.4W×0.3h (mm), no step difference, no center angle, 12 grooves Studying the drag coefficient Cd in FIG. 6, with the cable (1) of the related art, as shown by the curve CV1, the drag coefficient Cd becomes minimum at a wind speed of around 20 m/s, then increases somewhat when the wind speed becomes higher. The drag coefficient Cd becomes about 1 at a wind speed of 80 m/s.

As opposed to this, with the cable (2) of the present invention, as shown by the curve CV2, the drag coefficient Cd becomes minimum at a wind speed around 30 m/s, then gradually increases. At a wind speed of 80 m/s, the drag coefficient Cd becomes about 0.88. Since the design wind speed of wind loads of supports for power transmission lines in Japan is 40 m/s in the summer hurricane season, comparing the drag coefficient at such a wind speed with that of cable of the related art, that of the cable (2) of the present invention is reduced to about 80% that of the cable of the related art. Namely, if using the cable (2) of the present invention, the design strength of steel towers and other supports can be reduced and therefore there is a notable economic effect. As shown by the curve CV3, the cable (3) of the present invention exhibits similar tendencies as the cable (2) of the present invention, but the drag coefficient Cd becomes minimum at a wind speed of near 50 m/s and thereby shifts somewhat to the high wind speed. The cable (4) of the present invention is one with grooves of an aspect ratio (W/h) of 2/1. As shown by the curve CV4, the best characteristics are exhibited from a low wind speed to a high wind speed. At a wind speed of 40 m/s, an effect of reduction of more than 30% is obtained. The cable (5) of the present invention is one with an aspect ratio (W/h) of 15/1. As shown by the curve CV5, the drag coefficient Cd becomes minimum near a wind speed of 25 m/s, then gradually increases. At a wind speed of 80 m/s, the drag coefficient Cd becomes about 0.87. When the aspect ratio of the groove is large and there are a large number of grooves, the surface roughness of the cable increases and the effect of reduction at a high wind speed is reduced. At a wind speed of 80 m/s, there is an effect of reduction of more than 20%. The cable (6) of the present invention has an aspect ratio of grooves of a larger 11 to 1 compared with the cable (4) of the present invention. In this case, as shown by the curve CV6, the rate of reduction of the drag coefficient Cd at the low wind speed side deteriorates. However, the minimum value of the drag coefficient Cd is near a wind speed of 40 m/s. The drag coefficient Cd is 0.69.

As explained above, according to the results of tests on the relationship of the wind speed and the drag coefficient Cd for a variety of overhead cables with and without step differences at the outer circumference, with different numbers of grooves, and with different aspect ratios of the grooves, when comparing the drag coefficients Cd of the overhead cables of the present invention and the cable of the related art in the high wind speed range from 30 m/s to 40 m/s, it was found that all of the overhead cables of the present invention have effects of reduction of more than 20%. Further, it became clear that by suitably selecting the number of grooves and the aspect ratio, it is possible to select the optimum drag coefficient Cd for a desired design wind speed.

Figure 7:
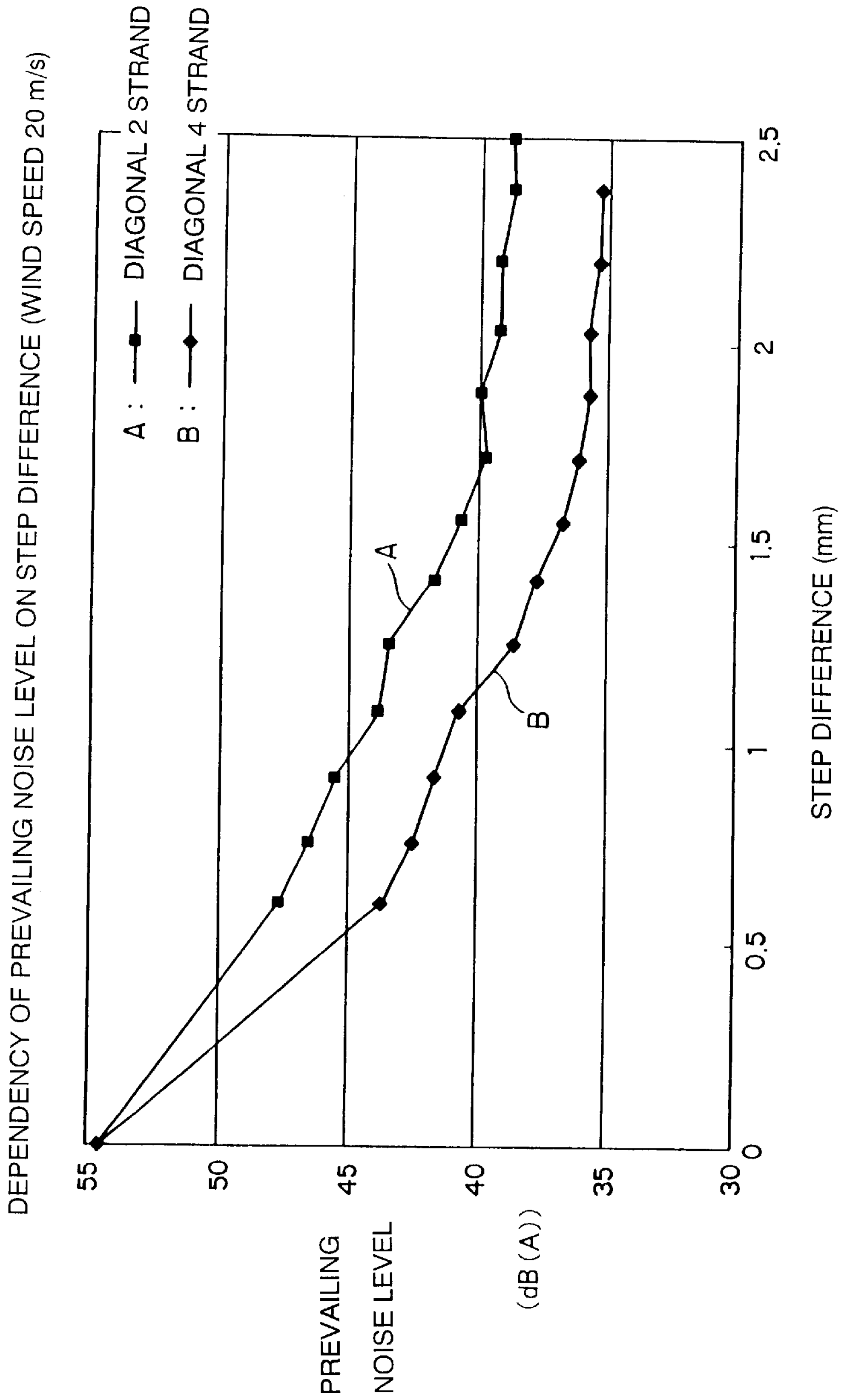
FIG. 7 is a graph of the relationship of the step difference and the prevailing noise level.

FIG. 7 shows the results of a study of the changes of the prevailing noise level when providing step differences having a center angle θ of 36° at two locations at facing positions (diagonal 2 strands) and four locations (diagonal 4 strands) and changing the step difference. The abscissa indicates the step difference H (mm), while the ordinate indicates the prevailing noise level (dB(A)).

As is clear from FIG. 7, a diagonal 4 strand overhead cable provided with step differences at four locations around the cable, compared with a diagonal 2 strand one (graph A), has a lower prevailing noise level even when the step difference is made lower and gives a larger effect (graph B). When reducing the step difference, it is also possible to suppress an increase of the drag coefficient, therefore a diagonal 4 strand configuration is preferable to a diagonal 2 strand configuration to reduce the wind noise and reduce the wind load.

Figure 8:
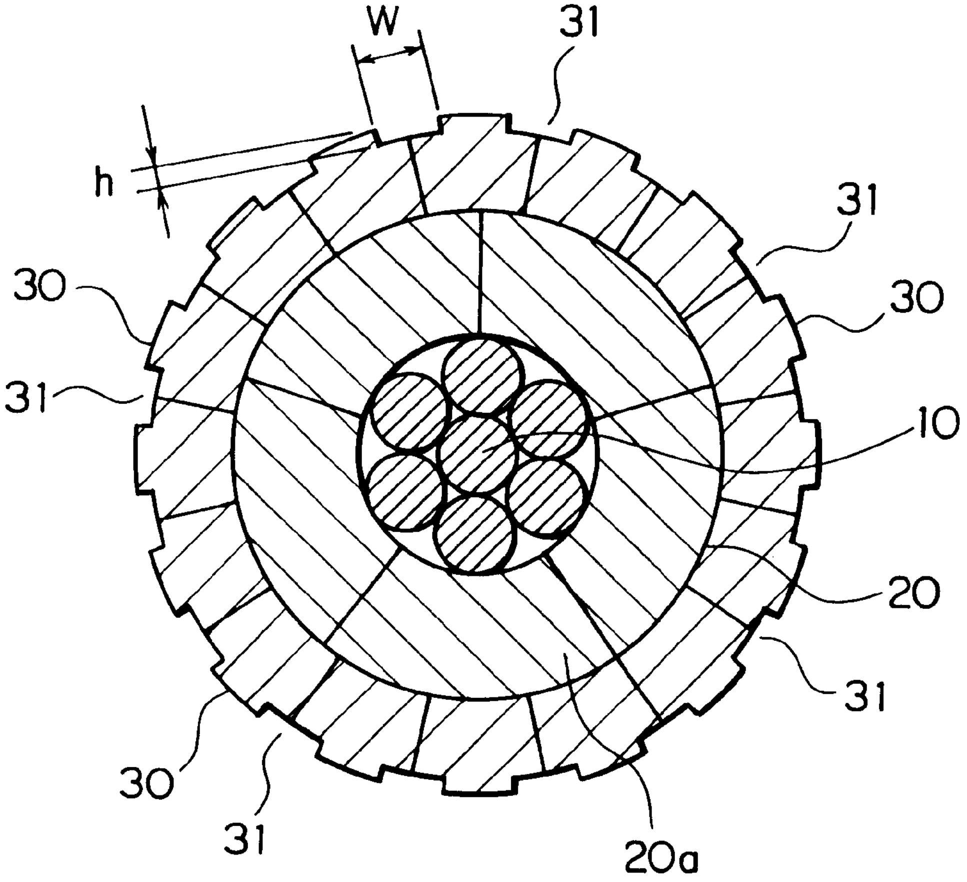
FIG. 8 is a cross-sectional view of another embodiment of the overhead cable according to the present invention.
Figure 9:
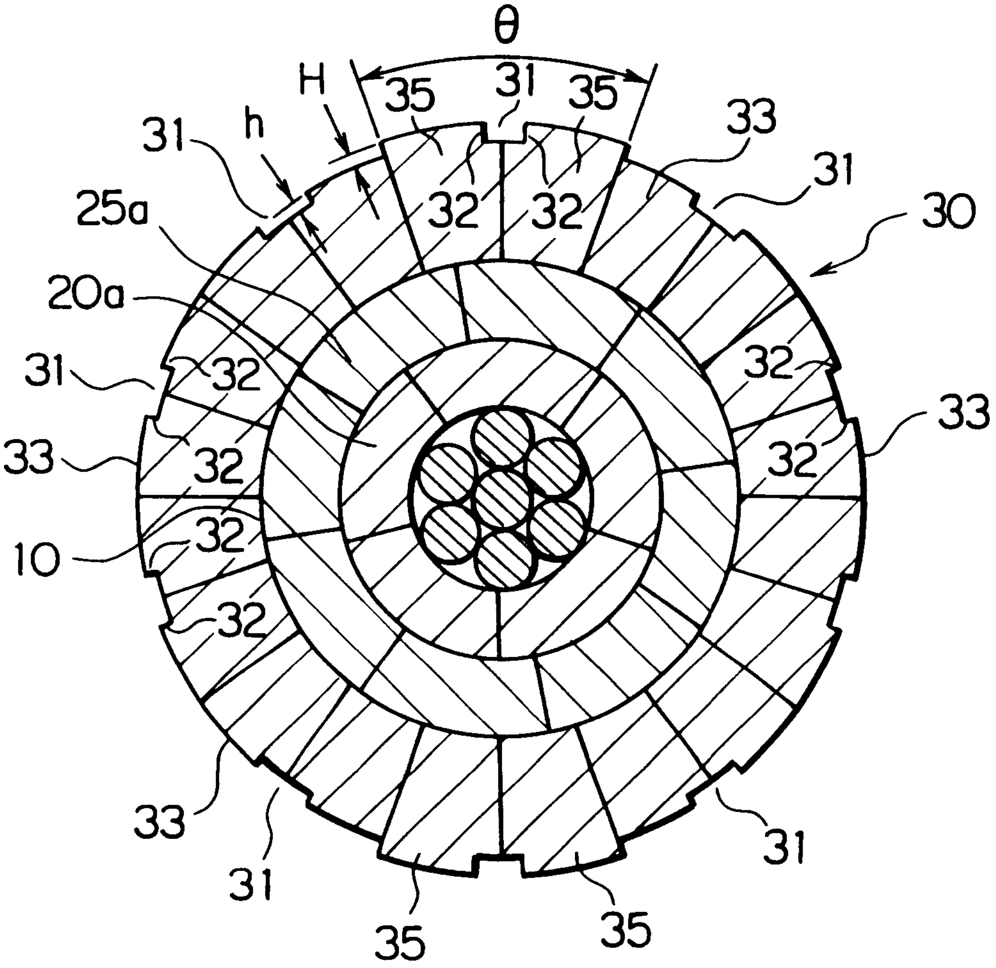
FIG. 9 is a cross-sectional view of still another embodiment of the overhead cable according to the present invention.

FIGS. 8 and 9 show still other embodiments. The overhead cable shown in FIG. 8 is formed by twisting around the outer circumference of seven steel core strands 10 serving as a core partially bearing the tension five aluminum strands 20*a* with a cross-section of a substantially sectoral shape as segment strands forming the conductive layer, then further twisting around that outer circumference 16 segment strands 30 having an sectoral cross-section serving as the outermost layer. The overhead cable shown in FIG. 9 is formed by twisting around the outer circumference of seven steel strands 10 serving as a core partially bearing the tension five aluminum strands 20*a* with a cross-section of an approximately sectoral shaped serving as a first conductive layer, twisting around that outer circumference eight aluminum strands 25*a* with a cross-section of an approximately sectoral shape serving as segment strands forming a second conductive layer, and further twisting around that outer circumference 16 thin segment strands 33 and four thick segment strands 35 having a sectoral shape serving as the outermost layer.

By using aluminum strands 20*a* and 25*a* with cross-sections of approximately sectoral shapes in this way, when the cross-sectional area of the conductive paths is constant, the outer diameter of the cable can be made smaller compared with one using aluminum strands having a circular cross-section.

Note that the overhead cable according to the present invention is not limited to the above embodiments. For example, the number of spiral grooves can be suitably selected. According to various experiments, the preferable number of the spiral grooves is between 6 and 36. Also, it is possible to make the size of the spiral grooves provided in one overhead cable different and provide two or more types of spiral grooves on one overhead cable. Further, it is possible not to provide the spiral grooves at the boundary portions of the twisted segment strands and to provide them at part of the outer circumferential surfaces of the segment strands.

As explained above, according to the overhead cable according to the first aspect of the present invention, by providing an overhead cable formed by twisting segment strands as an outermost layer wherein provision is made at a part of the outer circumferential surface of the segment strands or an outer circumferential surface region of a boundary portion where segment strands are twisted together and adjoin each other at least one or a plurality of spiral grooves forming recesses with bottom portions having rectangular cross-sections at intervals in the circumferential direction of the overhead cable, it is possible to disturb the boundary layer at the spiral grooves and possible to shift the breakaway point of the boundary layer to the rear of the segment strands. Due to this, an overhead cable superior in reducing the wind load can be obtained.

By making $1<W/h<16$ where the width of the spiral groove forming the above cross-section is W and the depth is h, an overhead cable superior in reducing the wind load can be obtained.

As another embodiment according to the above first aspect of the present invention, by providing the two edge portions of the spiral grooves with a chamfer of a gradient of 10% or less or a chamfer of a radius of curvature of D/2 or less (where D is the diameter of the overhead cable), the disturbance in the spiral grooves can be further increased and further reduction of the wind load can be obtained.

As another embodiment according to the above first aspect of the present invention, by forming a conductive layer by twisting together a plurality of segment strands with a cross-section of an approximately sectoral shape, the conductive path area of the conductive layer can be effectively secured and the diameter of the cable as a whole can be made smaller.

According to the overhead cable according to the second aspect of the present invention. by using thin segment strands and at least one thick segment strand as the segment strands forming the outermost layer and satisfying $0.01<H/D<0.10$ and $10°<\theta<90°$ where the step difference of the thin segment strands and the thick segment strands is H, the center angle of the thick segment strands is θ, and the outer diameter of the cable formed by the thin segment strands is D, an overhead cable superior in reducing noise (wind noise and corona noise) can be obtained.

As another embodiment according to the second aspect of the present invention, by providing at a part of the outer circumferential surface of the segment strands or an outer circumferential surface region of a boundary portion where segment strands are twisted together to adjoin each other at least one or a plurality of spiral grooves forming recesses with a bottom portion having a rectangular cross-section at intervals in the circumferential direction of the overhead cable or by satisfying $1<W/h<16$ where the width of the spiral grooves is W and the depth is h, an overhead cable superior in not only reducing noise but also reducing wind load can be obtained.

As another embodiment according to the second aspect of the present invention, by providing the two edge portions of the spiral grooves with a chamfer of a gradient of 10% or less or a chamfer of a radius of curvature of D/2 or less (where D is the diameter of the overhead cable), the disturbance in the spiral grooves can be further increased and a further reduction of the wind load can be obtained.

As another embodiment according to the second aspect of the present invention, by forming a conductive layer by twisting a plurality of segment strands with cross-sections of an approximately sectoral shape, the conductive path area of the conductivity layer can be effectively secured and the diameter of the cable as a whole can be made smaller.

Figure 10:
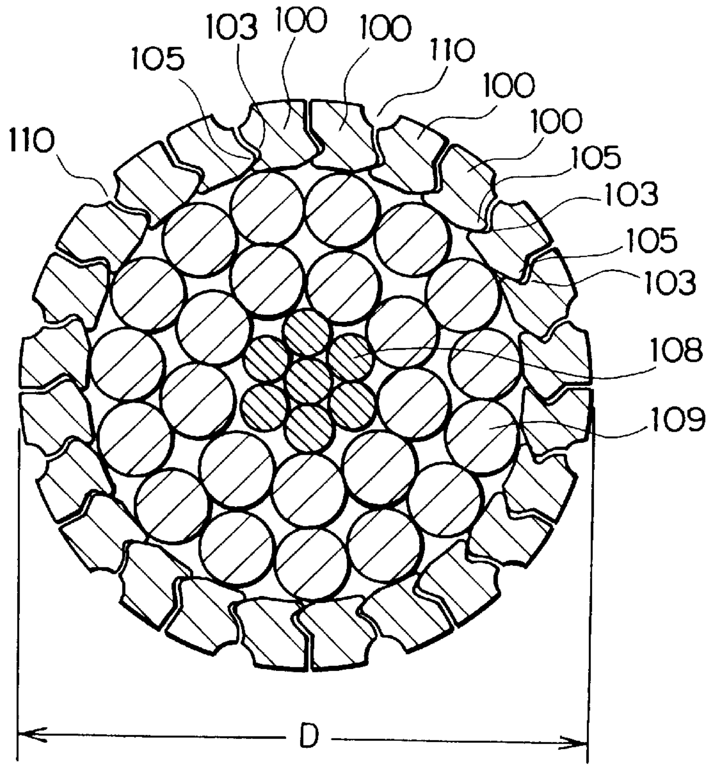
FIG. 10 is a cross-sectional view of an embodiment of the overhead cable according to the present invention.
Figure 11:
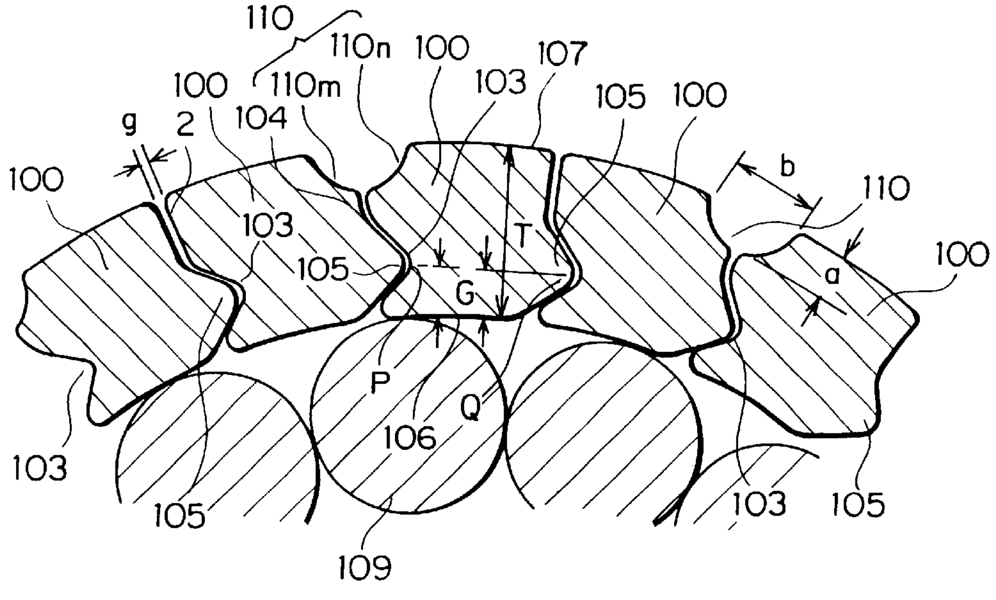
FIG. 11 is an enlarged view of the twisted strand portion of the outermost layer of the embodiment shown in FIG. 10.

Next, embodiments of the overhead cable according to the third aspect of the present invention will be explained with reference to the drawings. FIG. 10 is a cross-sectional view of an embodiment of the overhead cable according to the third aspect of the present invention. FIG. 11 is a cross-sectional view showing enlarged the twisted strand portion of the outermost layer. As shown in FIG. 10, this overhead cable is formed by twisting around the outer circumference of the steel core strands 108 serving as a core for partially bearing the tension nine aluminum strands 109 having a circular cross-section as a first conductive layer, further twisting 15 aluminum strands 109 having a circular cross-section as a second conductive layer, and further twisting around that outer circumference 24 segment strands 100 having a trapezoidal cross-section as an outermost layer to give an outer diameter D.

Figure 12:
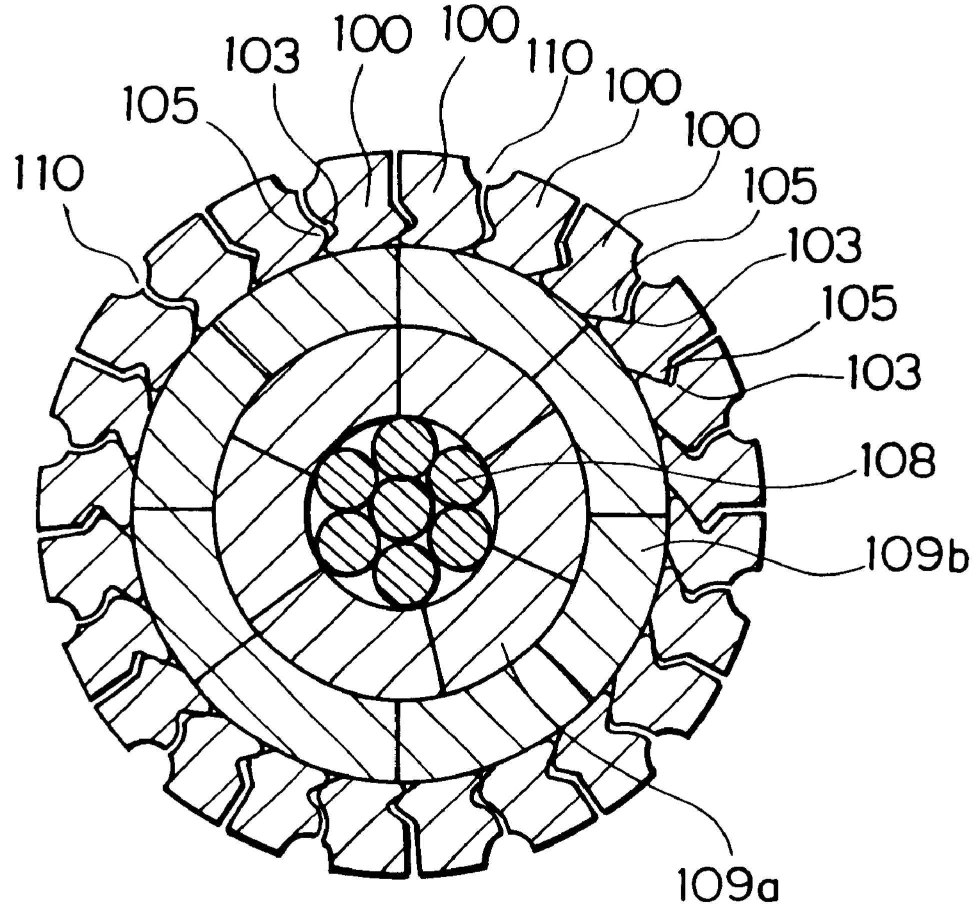
FIG. 12 is a cross-sectional view of another embodiment of the overhead cable according to the present invention.

This segment strands 100 are strands made of a conductive material such as an aluminum alloy and copper or having a surface of a conductor (for example, aluminum coated steel strands). The overhead cable of the present invention includes not only power transmission lines, but also overhead ground lines. Note that, as the aluminum strands 109, by using segment strands having a sectoral cross-section, that is, the aluminum strands 109*a* and 109*b* shown in FIG. 12, instead of aluminum strands having a circular cross-section, it is possible to increase the density of the cross-section and achieve greater compactness and to increase the current-carrying capacity while maintaining an identical outer diameter.

Each of the segment strands 100 is, as shown in FIG. 11, provided at one side surface 102 among a pair of side surfaces facing each other in the cable diametrical direction with a recessed portion 103 opening in an approximately V-shape (where the V-shaped bottom is not acute angular groove, but arc surface groove) in the longitudinal direction of the strands and provided at the other side 104 with a projecting portion 105 projecting out in an approximate V-shape (where the V-shaped top of the projection is not an acute angular projection, but an arc surface projection) in the longitudinal direction on the strand. The approximately V-shaped recessed portion 103 and projecting portion 105 are designed so that when twisting together the segment strands 100 to form the outermost layer, the top of the projecting portion 105 provided at the side surface 104 of one of the adjacent strands 100 fits into the recessed portion 103 provided in the side surface 102 of the other adjacent strand 100.

By twisting together the segment strands 100 having the recessed portions 103 and the projecting portions 105 on their two side surfaces in the cable diametrical direction as the outermost layer in this way, since the recessed portions 103 and the projecting portions 105 of the adjacent segment strands mate with each other, the slippage of the segment strands in the cable diametrical direction is prevented and the effect of preventing the strands from sticking out or becoming slack becomes greater.

The above recessed portion 103 and the projecting portion 105 are, as shown in FIG. 11, formed so that the space G between the center portion P of the bottom of the recessed portion 103 and center portion Q of the top of the projecting portion 105 and the bottom surface 106 of the twisted segment strand layer (outermost layer) becomes within the range of $0.2T \leqq G \leqq 0.8$ (mm) with respect to the thickness T of the segment strands 100 (distance from bottom surface 106 to cable outer circumferential surface 107) of the segment strands 100. When the center portion P of the bottom of the recessed portion 103 and the center portion Q of the top of the projecting portion 105 are positioned closer to the inside bottom surface 106 side than the outer circumferential surface 107 side of the segment strands 100, the effect of prevention of the strands from sticking out or becoming slack is larger, so the distance G with the point P and the point Q is preferably made in the range of 0.2T to 0.8T (mm). If the center points P and Q are positioned on the outer surface of the segment strands, the twisted segment strands are apt to loosen or deform when the cable is bent. This sometimes remains permanently. It becomes difficult to form a smooth cable surface and the problem easily arises that the wind load resistance cannot be reduced.

On the surface of the above twisted segment strand layer (outermost layer), grooves with a recessed cross-section are provided at an outer circumferential region of boundary portions where segment strands are twisted together and adjoin each other so as to form spiral grooves 110 at predetermined intervals in the circumferential direction of the cable. A spiral groove 110 is, as shown in FIG. 11, formed by two recessed arc surfaces 110*m* and 110*n* comprised by making the surfaces of the shoulders of the cable outer circumferential side of the side surfaces of adjacent segment strands 100 recessed arc shapes. The cross-sectional shape of the recess indentation forms a semi arc or a shallow arc. As to the number of the spiral grooves 110 provided at the cable surface, a plurality are provided at intervals in the cable circumferential direction, but even one may be provided. In the present embodiment, an example is shown of providing spiral grooves 110 at the outer circumferential side of every other adjoining boundary portion among adjoining boundary portions of the segment strands 100 forming the outermost layer, however it is also possible to provide a groove at the outer circumferential surface of one segment strand. Also, the cross-section of the spiral groove 110 may be a groove forming a recess with a bottom portion having a rectangular cross-section as explained above.

Figure 13:
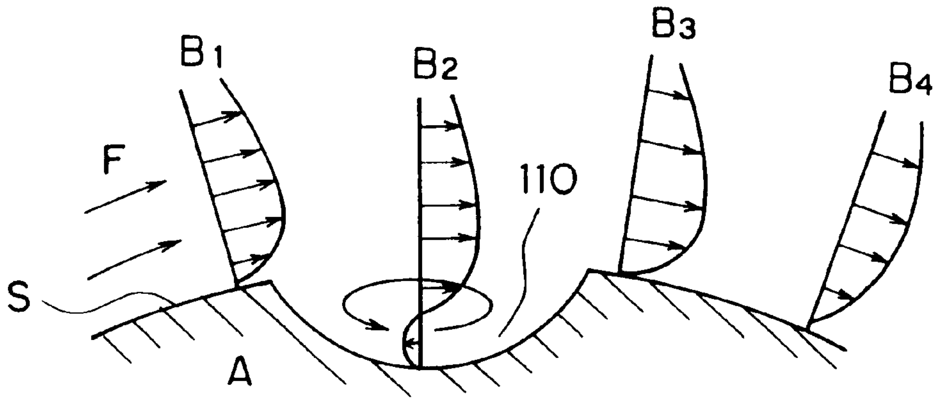
FIG. 13 is an explanatory view of a boundary layer of a wind air flow on the surface region of the overhead cable according to the present invention.

By forming the spiral grooves 110 in the surface of the outermost layer formed by twisting the segment strands 100 in the above way, the wind load when wind blows against the overhead cable is reduced. Namely, as shown in FIG. 13, if wind F blows against the cross-sectionally shown overhead cable A from the side, the air flow forms a thin boundary layer B along the cable surface S and flows on the cable surface toward the downwind side like B1→B2→B3→B4. The air flow is mixed in the arc surface grooves to promote turbulence, the air flow once breaking away from the cable surface near 70° returns again to the cable surface at the rear around 110°, then breaks away from the cable surface at the downwind side. By the breakaway point of the boundary layer shifting to the rear of the cable surface in this way, the wake flow of the downwind side of the cable becomes smaller and the wind load resistance is reduced. Namely, in a conventional cable without the above recessed portions on the cable surface, the air flow breaking away around 70° flows away without returning again, so the wake flow on the downwind side of the cable becomes large and the wind load resistance is not reduced, but in the overhead cable of the present invention, the air flow becomes mixed in the spiral grooves 110 to promote turbulence, the air flow once breaking away from the cable surface again returns to the cable surface at the rear, the breakaway point shifts to the downwind side, the wake flow at the downwind side of the cable becomes smaller, and the wind load resistance is reduced.

As to the size of the above spiral grooves 110, when the depth is a and the width of the opening portion is b, formation the grooves so that the ratio of the depth a and the width b becomes in the range of $0.05 \leqq a/b \leqq 0.5$ is preferable in terms of the effect of reduction of the wind load. The width b is generally 2 to 10 mm, preferably 5 to 7 mm, whereupon the depth a becomes 0.25 to 0.35 mm or more.

If the value of the above a/b is made not more than 0.05, the depth of the spiral groove becomes too shallow and the effect of promotion of turbulence ends up being largely reduced. According to observation of the turbulence by visualization, when a/b is 0.05 or more, it is seen that the boundary layer of the air flow violently vibrates when passing through the inside of the spiral grooves and it was confirmed that this was a factor effectively promoting the turbulence of the laminar flow and reducing the wind load resistance. On the other hand, when the value of the above a/b is 0.5 or more (depth a is 2.5 to 3.5 mm), the depth of the spiral grooves becomes too deep, turbulence in the grooves is not sufficiently promoted, and the laminar flow ends up passing above the spiral grooves, so the air flow breaks away at the upwind side of the cable and as a result the wind load resistance can no longer be sufficiently reduced.

As shown in FIG. 11, a space g is formed between adjoining portions of segment strands 100 forming the outermost layer. The space g is between 0.1 and 1.0 mm and is formed at least at one location among a plurality of adjoining portions. Due to the space g, even if there is some error in the dimensions of the segment strands 100, no overlayer occurs and the strands do not stick out or become slack.

Figure 14:
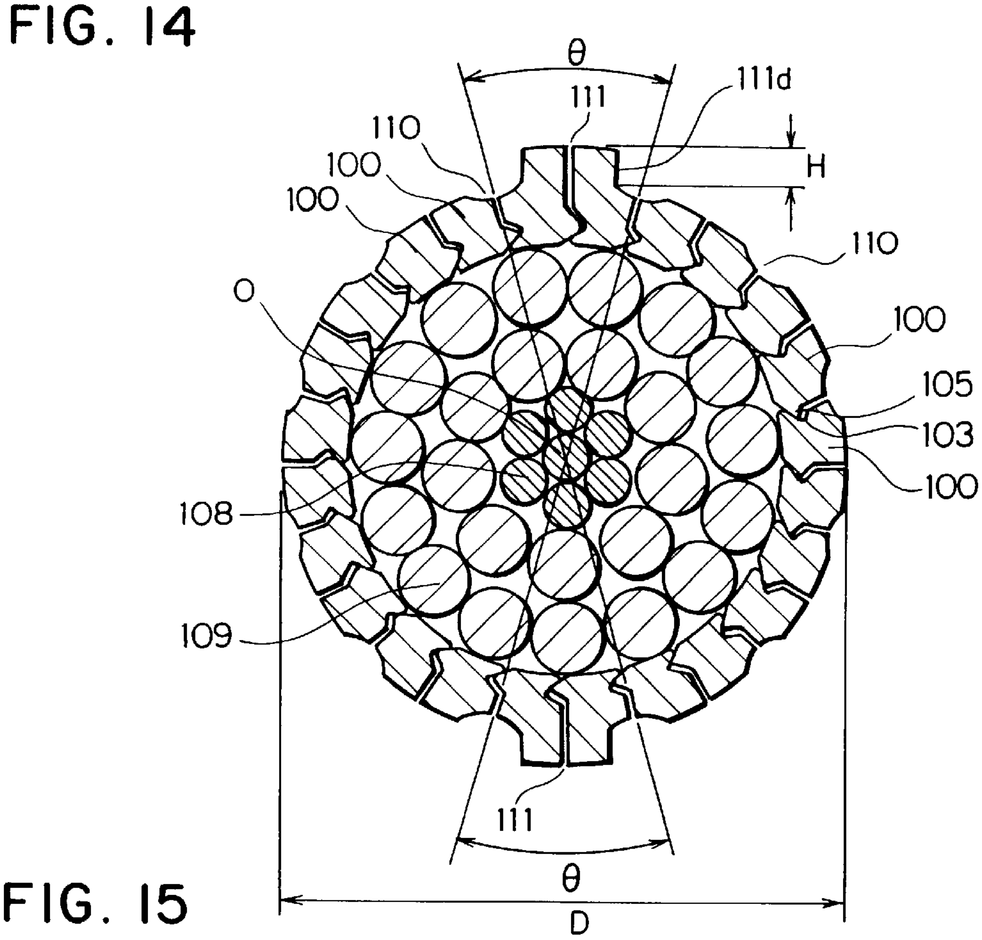
FIG. 14 is a cross-sectional view of still another embodiment of the overhead cable according to the present invention
Figure 15:
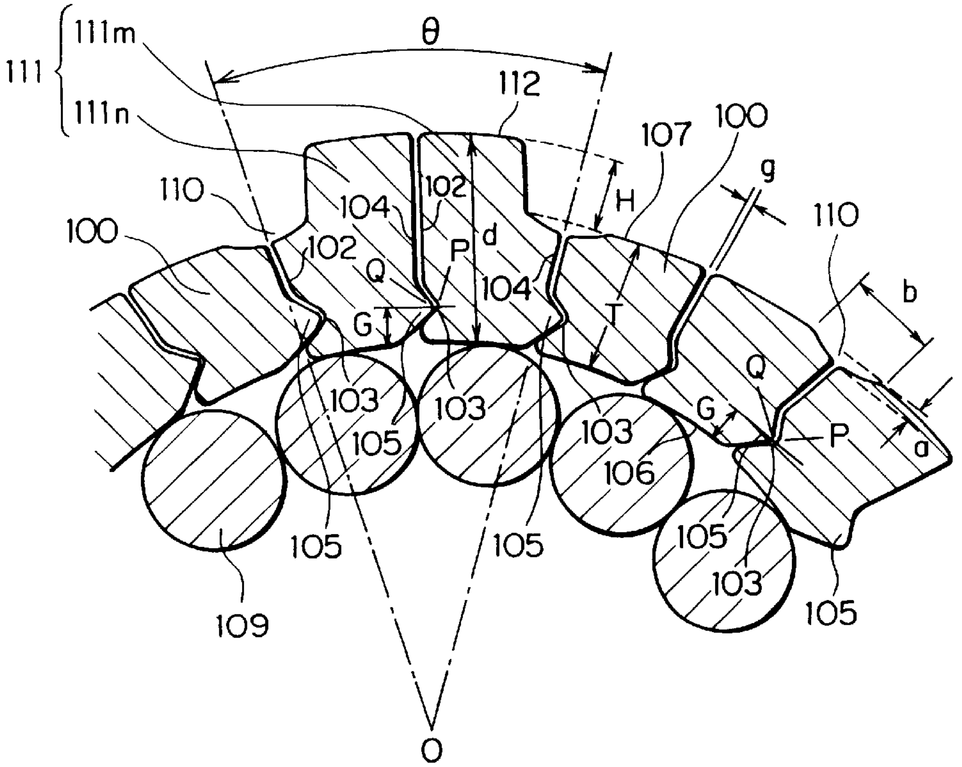
FIG. 15 is an enlarged view of the twisted strand portion of the outermost layer of the embodiment shown in FIG. 14.

FIG. 14 is a cross-sectional view of another embodiment, while FIG. 15 is a cross-sectional view showing enlarged part of the outermost layer. Reference numerals the same as FIG. 10 and FIG. 11 show the same parts. The overhead cable of this embodiment, in the same way as in the embodiment shown in FIG. 10 and FIG. 11, is formed by twisting thick segment strands 111 having a thickness d in the diametrical direction greater than the thickness T of the segment strands 100 in the cable diametrical direction sandwiched between thin segment strands 100 having the thickness T when twisting the segment strands 100 to form the outermost layer having the outer diameter D. Half of the outer surface side of the thick segment strands 111 projects out in a spiral form from the cable circumferential surface. When forming the outermost layer, at least one thick segment strand is twisted together. In the embodiment shown in FIG. 14, an example is shown of. twisting together a pair of thick segment strands 111 facing each other on a diametrical line.

In the overhead cable of the embodiment shown in FIG. 14 and FIG. 15, the thick segment strands 111 are formed by combining a pair of left and right thick segment strands 111*m*, 111*n* comprised of two segment strands having the same width as the thin segment strands 100 made thicker. As shown in FIG. 15, the strands are twisted together by fitting the top of the projecting portion 105 provided at the right side surface 104 of the left side thick segment strand 111*n* into the recessed portion 103 provided at the left side surface 102 of the right side thick segment strands 111*m*, by fitting the top of the projecting portion 105 of the further left side adjacent thin segment strand 100 into the recessed portion 103 provided on the left side surface 102 of the left side thick segment strand 111*n*, and by fitting the top of the projecting portion 105 provided on the right side surface 104 of the right side thick segment strand 111*m* into the recessed portion 103 of the further right side adjacent thin segment strand 100. In other regions of the outermost layer, the adjacent thin segment strands 100 are twisted together by fitting the adjacent recessed portions 103 and the projecting portions 105.

The distance G between the center portion P of the bottom of the above recessed portion 103 and center portion Q of the top of the projecting portion 105 and the bottom surface of the twisted segment strand layer is made within the range of 0.2T to 0.8T (mm) with respect to the thickness T of the thin segment strands forming the outermost layer having an outer diameter D. The same explanation as provided above applies to the selection of the distances G from the center portions P of the bottoms of the recessed portions 103 and center portions Q of the tops of the projecting portions 105 provided on the two sides of the thick segment strands 111 to the bottom surfaces of the segment strands 100.

By twisting the thick segment strands 111 between the thin segment strands 100 in this way, as shown in FIG. 15, a step difference H is formed between the outer circumference surfaces 107 of the twisted thin segment strands 100 and the outer circumferential surfaces 112 of the thick segment strands 111. The projections 111*d* of the thick segment strands 111 projecting out from the cable circumferential surface by exactly the height of the step difference H forms the spiral projections projecting out from the cable circumferential surface in spiral form.

As in the above embodiment, the spiral projection (projections) for reducing the level of the wind noise has a larger effect of disturbing the karman vortex when provided on a smoother surface rather than on a rough surface having deep grooves in the cable circumferential surface. In other words, with a cable with a rough surface, it is not possible to efficiently reduce the noise level unless projections are provided higher than the height of the projections on a cable with a smooth surface. Accordingly, in order to make the projection height lower to reduce the wind noise level without increasing the wind load resistance, a combination of grooves and projections close to an arc smooth surface is the most preferable.

The above step difference H is set with respect to the outer diameter D of the outermost layer formed by the thin segment strands 100 so that the value of H/D becomes within the range of $0.01<H/D<0.10$. When the step difference H is too small, the effect of noise reduction is lost, while when it is too large, the wind load resistance becomes large and the effect of reduction of the wind load is impaired. According to experiments, the effect of reduction of noise is lost when the step difference H is $H<0.01D$ and on the other hand $H<0.1D$ is necessary to obtain an effect of reduction of the wind load to 10 to 20% down from the wind load resistance of a cable of the related art having the same outer diameter. Note that it is possible to provide the above step difference H at four facing positions at the cable circumferential surface to reduce the wind load and reduce the noise reduction even lower.

The width between the two surfaces of the above thick segment strand 111 (in FIG. 15, the width between the right side surface 104 of the right side thick segment strand 111*m* and the left side surface 102 of the left side thick segment strand 111*n*) is set so that the center angle θ between the two side surfaces of a strand at the center O of the cable becomes within the range of 10°<θ<90°. If the center angle θ is less than 10°, a karman vortex is easily formed in the downwind side of the cable, the effect of reduction of the noise is impaired, and the thick segment strands 111 twisted at the outermost layer projecting out in a spiral on the cable circumferential surface are knocked down and the projections 111*d* are easily crushed and deformed when the cable is passed through pulleys when laying the cable, therefore the center angle θ is preferably more than 10°. Also, when the center angle θ exceeds 90°, the projected cross-sectional area is increased, the wind load resistance increases, and the effect of reduction of the wind load is impaired, therefore the center angle θ is preferably not more than 90°.

In the overhead cable of the present embodiment as well, in the same way as in the overhead cable of the above embodiment, the outer circumferential surface regions of the boundary portions where the segment strands forming the outermost layer adjoin each other are provided with arc-shaped grooves to form spiral grooves 110 on the cable outer circumferential surface. A plurality of or at least one such spiral groove 110 are formed at intervals in the cable circumferential direction. The thick segment strands 111 adjacent to the thin segment strands 100 are formed with recessed arc surfaces at the segment shoulders of the bottom edges of the projections 111*d* of the thick segment strands 111 to form grooves having arc surfaces together with the recessed arc surfaces of the adjoining thin segment strands 100.

By forming the spiral grooves 110 on the outer circumferential surface of the cable in this way, in the same way as in the above embodiment, the laminar flow flowing on the cable surface passes through the spiral grooves 110 and moves to the downwind side when the wind blows, the breakaway point shifts to the downwind side, the drag coefficient becomes smaller, and the wind load resistance is reduced. Also, by providing the optimum step difference H, the corona noise can also be reduced to be a sufficiently low level.

Also, in the same way as in the above embodiment, the ratio of the depth a and the width b of the opening portion of the spiral groove 110 is made within the range of 0.05≦a/b≦0.5 and a space g of 0.1 to 1.0 mm is formed at least at one location of the boundary portions where the segment strands 100 forming the outermost layer adjoin each other.

Figure 16:
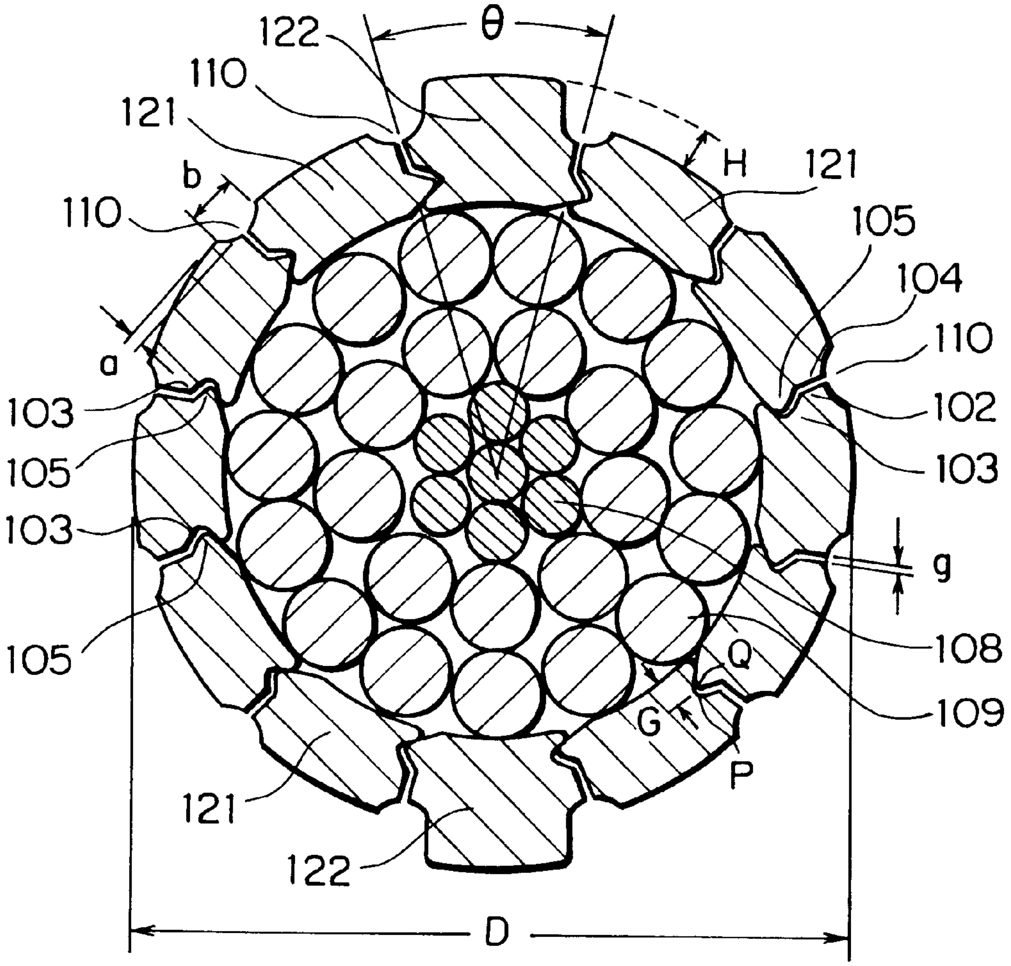
FIG. 16 is a cross-sectional view of still another embodiment of the overhead cable according to the present invention

FIG. 16 is a cross-sectional view of another embodiment, wherein the same reference numerals as those in FIG. 10, FIG. 11, FIG. 14, and FIG. 15 indicate the same parts. The overhead cable of the present embodiment is configured by using segment strands 121, 122 having a width equivalent to two of the above segment strands 100 of the embodiment shown in FIG. 10 and FIG. 14, twisting 1o thin segment strands 121 and two thick segment strands 122 to configure a cable having an outer diameter D of the outermost layer demarcated by the thin segment strands 121 and having two thick segment strands 122 facing each other on the diametrical line. In the overhead cable of the present embodiment, recessed arc shaped grooves are provided for every outer circumferential surface region of the boundary portions where the segment strands 121, 122 adjoin each other. A plurality of spiral grooves 110 are formed on the outer circumferential surface of the cable at intervals in the circumferential direction.

In the overhead cable of the present embodiment as well, in the same way as in the above embodiment, the recessed portions 103 and the projecting portions 105 provided at the two side surfaces of the thin segment strands 121 and the thick segment strands 122 are mated and twisted together. The center portions P of the bottoms of the recessed portions 103 and the center portions Q of the tops of the projecting portions 105 are positioned within the range of 0.2T≦G≦0.8T (mm) with respect to the thickness T of the segment strands 100.

Also, in the present embodiment, in the same way as in the above embodiment, the center angle θ is within the range of 10°<θ<90°, the step difference H between the outer circumferential surface of the thin segment strands 121 and the outer circumferential surface of the thick segment strands 122 is within the range of 0.01<H/D<0.10 with respect to the outer diameter D of the outermost layer demarcated by the thin segment strands 121, the ratio of the depth a and the width b of the spiral grooves 110 is within the range of 0.05≦a/b≦0.5, and the space g is formed between the segment strands.

Figure 17:
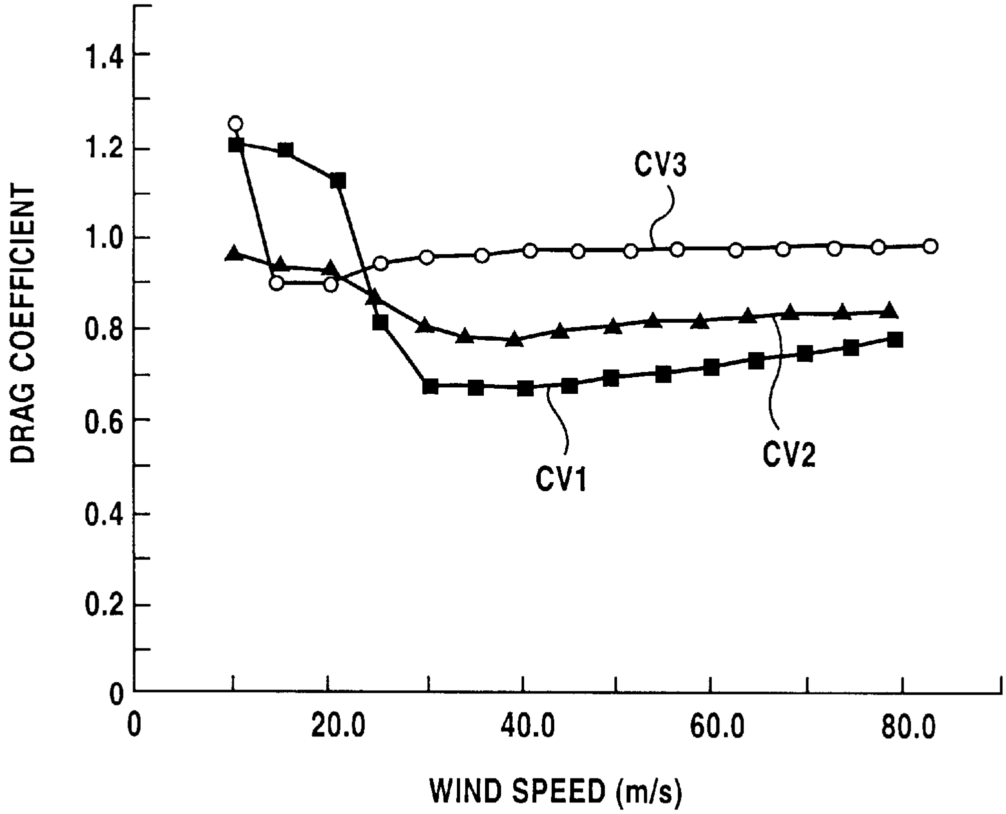
FIG. 17 is a view of the characteristic of the drag coefficient according to the result of wind tunnel tests of the overhead cable of the present invention and overhead cable of the related art.

FIG. 17 shows the drag coefficient characteristics in the results of a wind tunnel experiment on overhead cables of the present invention and a cable of the related art, that is, ACSR810 $mm^2$. The abscissa indicates the wind speed (m/s), while the ordinate indicates the drag coefficient Cd. The wind speed was measured up to 80 m/s in consideration of the strong winds during hurricanes. In the experiment, use was made of (1) LP810 $mm^2$ as a low wind load cable as a cable of the present invention, (2) LN810 $mm^2$ as a cable designed for reduction of the wind load and reduction of the noise as a cable of the present invention, and (3) ACSR810 $mm^2$ as a cable of the related art. As a result, as shown by the curve CV3 in FIG. 17, in the cable (3) of the related art, the drag coefficient Cd becomes maximum around the wind speed of 20 m/s, the drag coefficient Cd then increases somewhat when the wind speed becomes higher, and the drag coefficient Cd becomes about 1 at the wind speed of 80 m/s. On the other hand, in the cables (1) and (2) of the present invention, although the turbulence action in the spiral grooves 110 cannot be exhibited that much at a wind speed of about 20 m/s, when the wind speed exceeds 25 m/s, the wind load resistance is dramatically reduced due to the turbulence action in the spiral grooves 110 and is sustained even up to a wind speed of about 80 m/s. Namely, in the low wind load cable (1) of the present invention, as shown by the curve CV1 in FIG. 17, the drag Cd becomes minimum near the wind speed 30 m/s, the drag coefficient Cd then increases slowly, and the drag coefficient Cd becomes about 0.78 at the wind speed of 80 m/s. The design wind speed of the wind load in supports for power transmission lines in Japan is 40 m/s during summer hurricanes. The drag coefficient becomes 69% (0.67/0.97=0.67) of that of the cable of the related art at this wind speed. With the low wind load and low noise cable (2) of the present invention, as shown by the curve CV2 in FIG. 17, the drag coefficient becomes 80% (0.78/0.97=0.80) of that. Thus, in both of the cables (1) and (2) of the present invention, the wind load resistance is greatly reduced and the construction cost for steel towers, foundations, etc. can be reduced, so the economic effects are remarkable.

As is clear from the above embodiment, even with a cable having a step difference H of spiral projections on the cable outer circumferential surface, by selecting appropriate values so the ratio H/D of the step difference H with respect to the outer diameter D of the cable becomes in the range of the above 0.01<H/D<0.10, it is possible to reduce the drag coefficient Cd at a high wind speed region of 30 to 40 m/s by at least 20% compared with the cable of the related art.

Further, it became clear that by selecting the shape of the spiral grooves 110 formed on the outer circumferential surface of the cable so that the ratio of the depth a and the width b of the grooves becomes within the range of $0.05 \leqq a/b \leqq 0.5$, it is possible to select the optimum drag coefficient Cd with respect to a desired design wind speed. Further, by selecting the number of spiral grooves 110 within a predetermined range, it is possible to select the optimum drag coefficient Cd.

Figure 18:
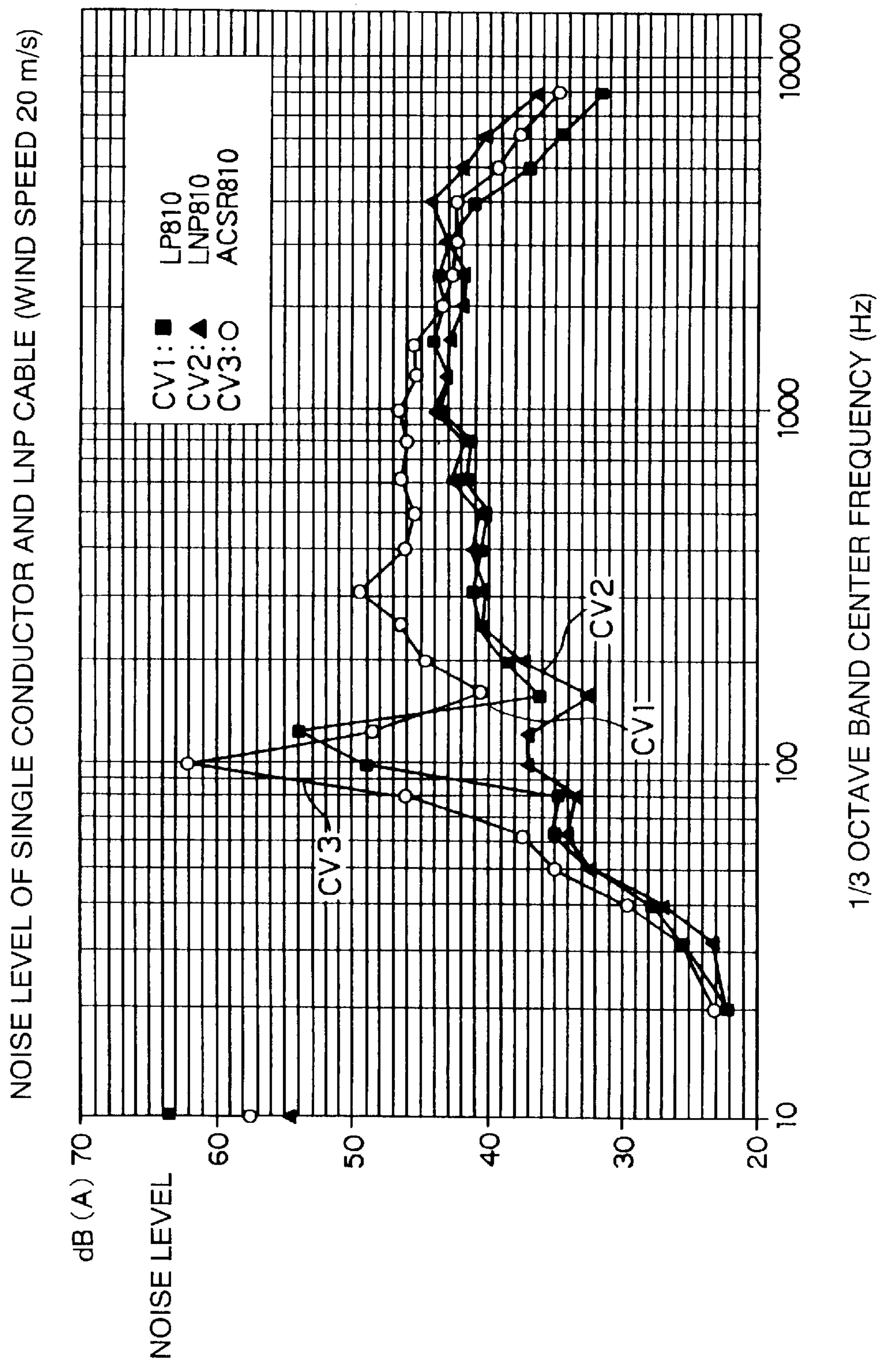
FIG. 18 is a view of the characteristic of noise of the overhead cable of the present invention and overhead cable of the related art.

FIG. 18 shows the results of measurement of the wind noise characteristics of cables of the present invention and a cable of the related art in which the abscissa indicates the noise frequency (Hz) and the ordinate indicates the noise level dB (A). In the experiment, as the overhead cable, use was made of (1) LP810 $mm^2$ with an outer diameter of 37.2 mm as a low wind load cable of the present invention, (2) LN810 $mm^2$ with 36.6 mm, a step difference H of 2 mm, and a pair of projections having a center angle θ of about 26° projecting out from the cable circumferential surface as a low wind load and low noise cable of the present invention, and (3) ACSR810 $mm^2$ as a cable of the related art. As clear from FIG. 18, in the cable (1) of the present invention wherein only the wind load resistance is reduced, as shown in by the curve CV1, since the outer circumferential surface of the cable is smoother than that of the cable of the related art, the wind noise level is apt to be somewhat higher, but in the cable (2) of the present invention designed to reduce the noise, however, as shown by the curve CV2, the prevailing frequency is eliminated and the wind noise level is greatly reduced.

Figure 19:
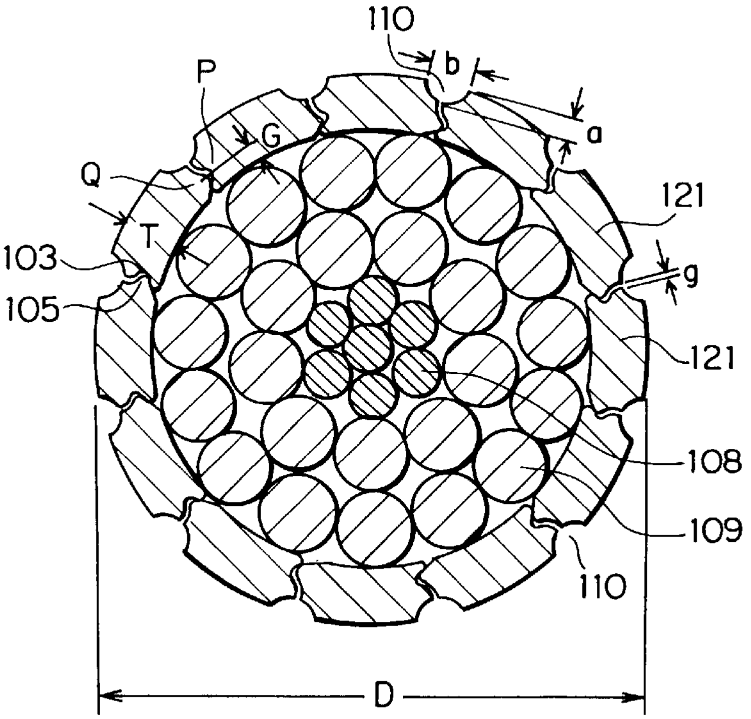
FIG. 19 is a cross-sectional view of another embodiment of the overhead cable according to the present invention.

FIG. 19 is a cross-sectional view of another embodiment, wherein the same reference numerals as those in FIG. 10 and FIG. 11 indicate the same parts. In the overhead cable of the present embodiment, the outermost layer is formed by twisting together segment strands 121 having a width of two of the segment strands 100 shown in FIG. 10, the recessed portions 103 and the projecting portions 105 provided at the side surfaces of the segment strands 121 are formed more obtuse than the shapes of the recessed portions 103 and the projecting portions 105 of the segment strands 100 in the above embodiment, the outermost layer of an outer diameter D is formed by twisting together 12 segment strands 121, and grooves having an arc cross-section are provided for every outer circumferential surface region of the boundary portions where the segment strands 121 adjoin each other in the state of formation of the outermost layer to form a plurality of spiral grooves 110 at intervals in the circumferential direction on the outer circumference surface of the cable.

In the present embodiment as well, in the same way as in the above embodiment, the distance G from the center portion P of the above recessed portion 103 and center portion Q of the top of the projecting portion 105 to the bottom surface of the segment strands 121 is set to satisfy $0.2 \leqq G \leqq 0.8T$ (mm) with respect to the thickness T between the bottom surface and the outer circumferential surface, a space g of 0.1 to 1.0 mm is formed at least at one location of the boundary portions where the segment strands 121 adjoin each other, and the depth a and the width b of the spiral groove 110 are set to satisfy $0.05 \leqq a/b \leqq 0.5$.

Figure 20:
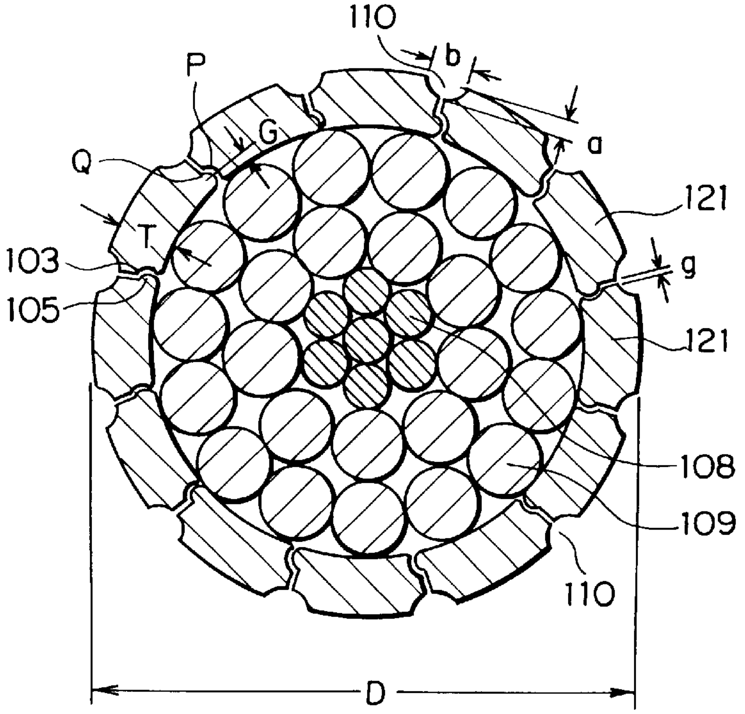
FIG. 20 is a cross-sectional view of still another embodiment of the overhead cable according to the present invent.

FIG. 20 is a cross-sectional view of still another embodiment, wherein the same reference numerals as in FIG. 10 and FIG. 11 indicate the same parts. The overhead cable of the present embodiment, in the same way as in the above embodiment, forms the outermost layer by twisting together segment strands 121 having a wide width, however, the recessed portions 103 and the projecting portions 105 provided at the side surfaces of the segment strands 121 are formed as arc-shaped recessed portions 103 and projecting portions 105 instead of being formed to approximately V-shaped cross-sections. In this embodiment as well, in the same way as in the above embodiment, the distance G from the center portions of the recessed portions 103 and the projecting portions 105 to the bottom surface of the segment strands 121 is made $0.2 \leqq G \leqq 0.8T$ (mm) with respect to the thickness T between the bottom surface and the outer circumferential surface, a space g of 0.1 to 1.0 mm is formed at least at one location of the boundary portions where the segment strands 121 adjoin each other, and the depth a and the width b of the spiral grooves 110 are set to satisfy $0.05 \leqq a/b \leqq 0.5$.

Figure 21:
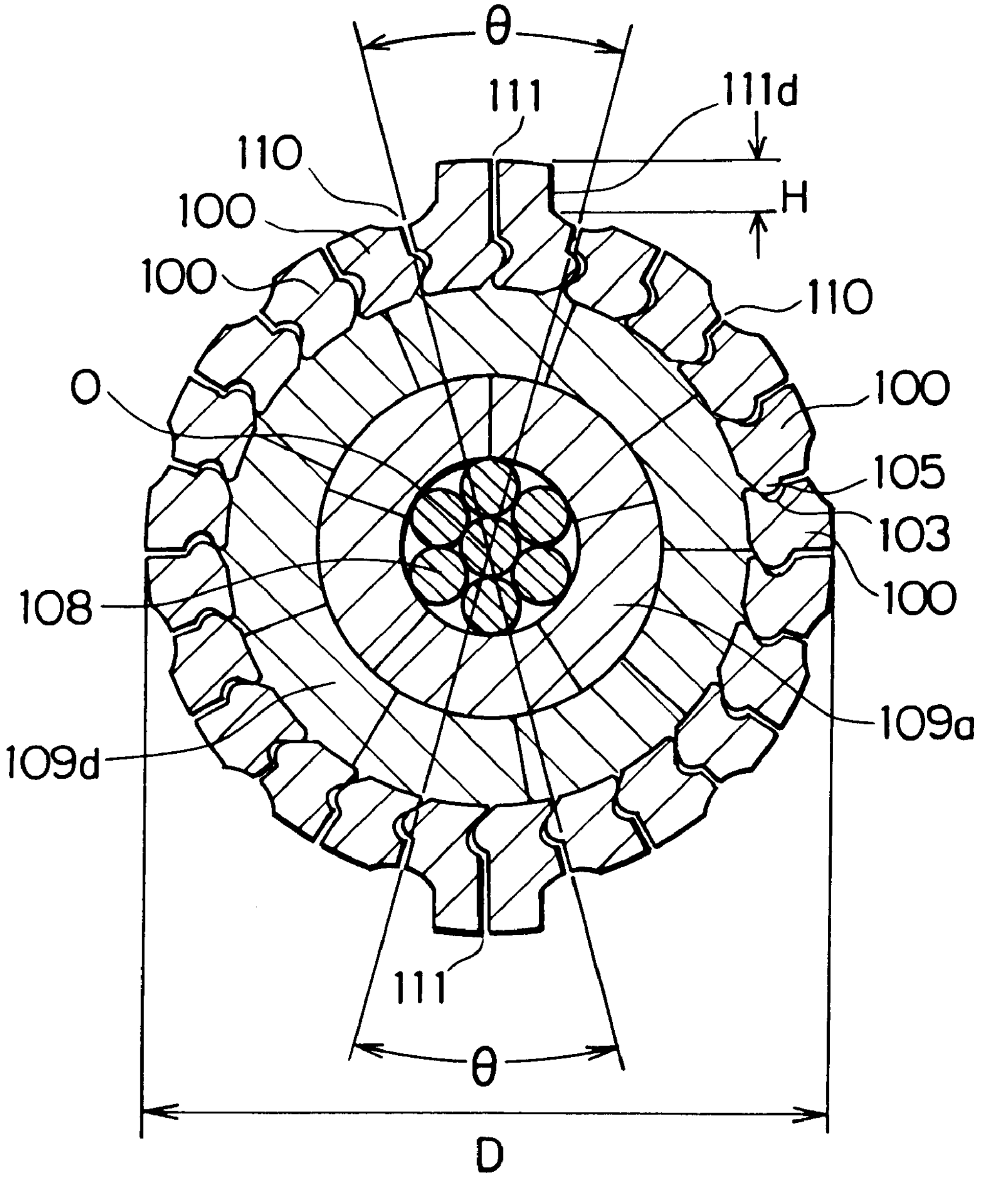
FIG. 21 is a cross-sectional view of still another embodiment of the overhead cable according to the present invention.

FIG. 21 shows still another embodiment. The overhead cable of this embodiment is formed by twisting around the outer circumference of seven steel core strands 108 serving as the core for partially bearing the tension five aluminum strands 109*b* with a cross-section having an approximately sectoral shape as segment strands forming a first conductive layer, twisting around that outer circumference nine aluminum strands 109*b* with a cross-section having an approximately sectoral shape as segment strands forming a second conductive layer, and twisting around that outer circumference 20 thin segment strands 100 having an approximately trapezoidal cross-section and four thick segment strands 111 as the outermost layer.

By adopting the aluminum strands 109*c*, 109*d* with cross-sections having an approximately sectoral shape in this way, when the cross-sectional area of the conductive path is made constant, the outer diameter of the cable can be made smaller compared with the case of use of aluminum strands having a circular cross-section.

Note that, the cables of the embodiments shown in FIG. 10 to FIG. 21 were shown as ones with a structure of four twisted layers, but the number of twisted layers can be changed in accordance with the size of the cable.

According to the overhead cable of the above third aspect of the present invention, since the recessed portions and the projecting portions are provided at the segment strands and the recessed and protecting portions of the adjacent segment strands are mated with each other when twisting, slippage of the strands at the time of twisting such as in the related art does not occur and the strands can be prevented from sticking out and becoming slack when passing the cable through the pulleys when laying the cable.

Also, since the outer circumferential surface of the outermost layer formed by the segment strands is provided with at least one or a plurality of spiral grooves forming a recessed cross-section at intervals in the cable circumferential direction, the breakaway point of the boundary layer flowing along the cable surface when the wind blows on the overhead cable shifts to the downwind side of the cable and the wind load is reduced.

Also, since the distance G from the center portions of the recessed portion and the projecting portion at the two side surfaces of the segment strands to the bottom surface of the segment strands is set to satisfy $0.2T \leqq G \leqq 0.8T$ (mm) with respect to the thickness T between the bottom surface and the outer circumferential surface of the segment strands, the effect of preventing the segment strands from sticking out or becoming slack due to their slipping in the cable diametrical direction when twisting the segment strands together to form the outermost layer becomes large.

Also, by forming a space of 0.1 to 1.0 mm at least at one location of the boundary portions where the segment strands adjoin each other, when twisting together segment strands while fitting the projecting portions of the segment strands into the recessed portions of the adjacent segment strands, even if there is some error in the dimensions of the segment strands, the error can be absorbed and adjusted by the above space, so the recessed portions and the projecting portions can be mated without any difficulties. Also, rain water entering inside the cable can be quickly discharged by the space.

Also, by setting the depth a and the width b of the spiral grooves formed on the outer circumferential surface of the outermost layer formed by the segment strands $0.05 \leqq a/b \leqq 0.5$, the optimum drag coefficient Cd can be selected for a desired design wind speed and the effect of reduction of the wind load can be increased.

Further, by forming the outermost layer by twisting together thin segment strands and at least one thick segment strand, forming a step difference H between the outer circumferential surface of the thin segment strands and the outer circumferential surface of the thick segment strands, and making the step difference H $0.01<H/D<0.10$ with respect to the outer diameter D of the outermost layer demarcated by the thin segment strands, a low wind noise cable having large effect of reduction of the wind load can be obtained.

Furthermore, by making the center angle θ of the thick segment strands $10° < \theta < 90°$, not only are a large effect of reduction of the wind load and effect of reduction of the noise obtained, but also it is possible to prevent the thick segment strands from being knocked down and the projections from being crushed or deformed when passing the cable through pulleys when laying the cable. Due to these effects, the corona noise level can also be suppressed to a low value.

Figure 22:
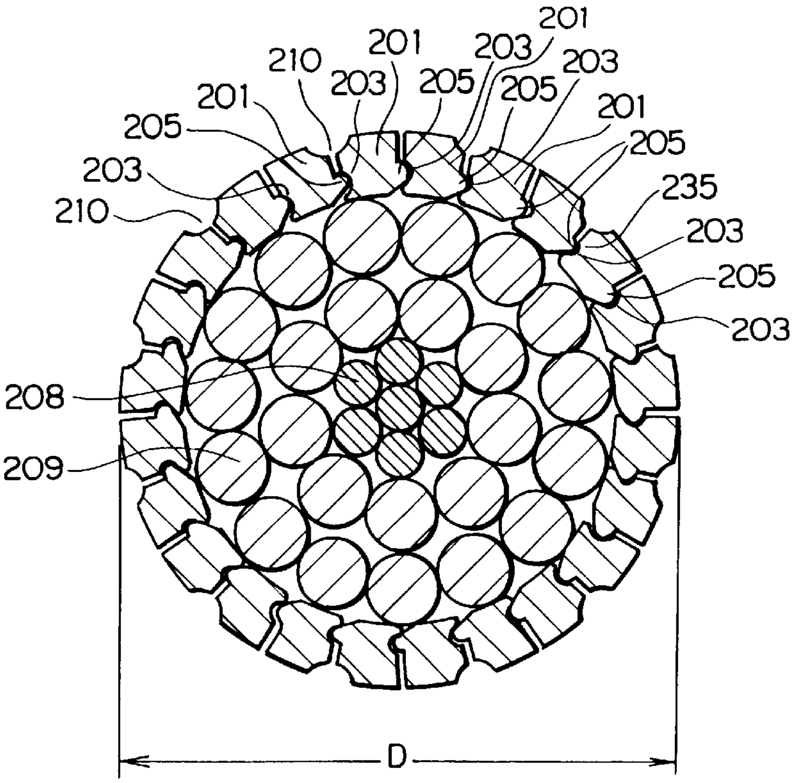
FIG. 22 is a cross-sectional view of an embodiment of the overhead cable according to the present invention.
Figure 23:
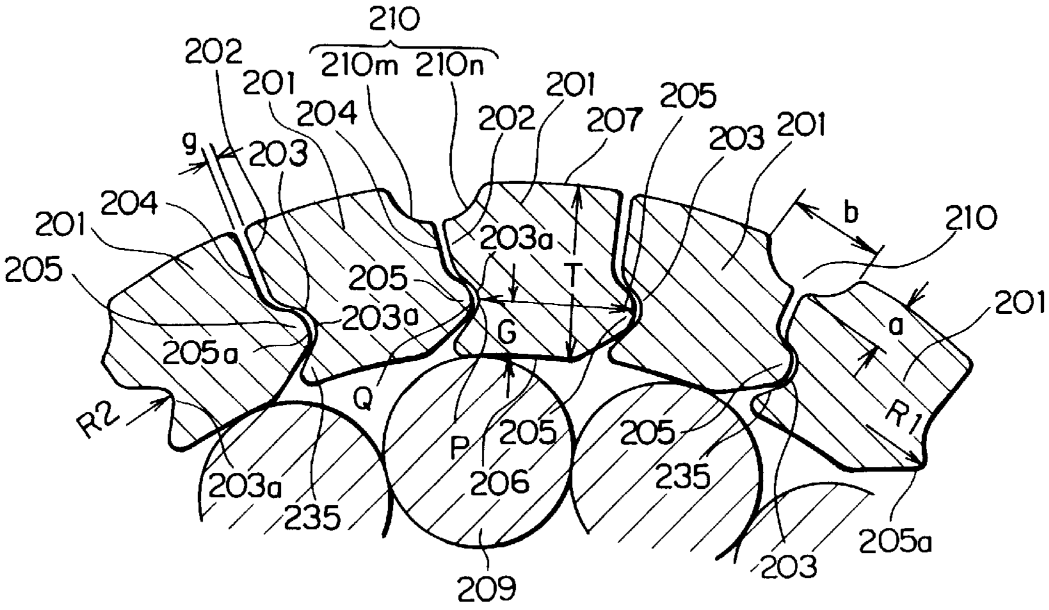
FIG. 23 is an enlarged view of the twisted strand portion of the outermost layer of the overhead cable shown in FIG. 22.
Figure 24:
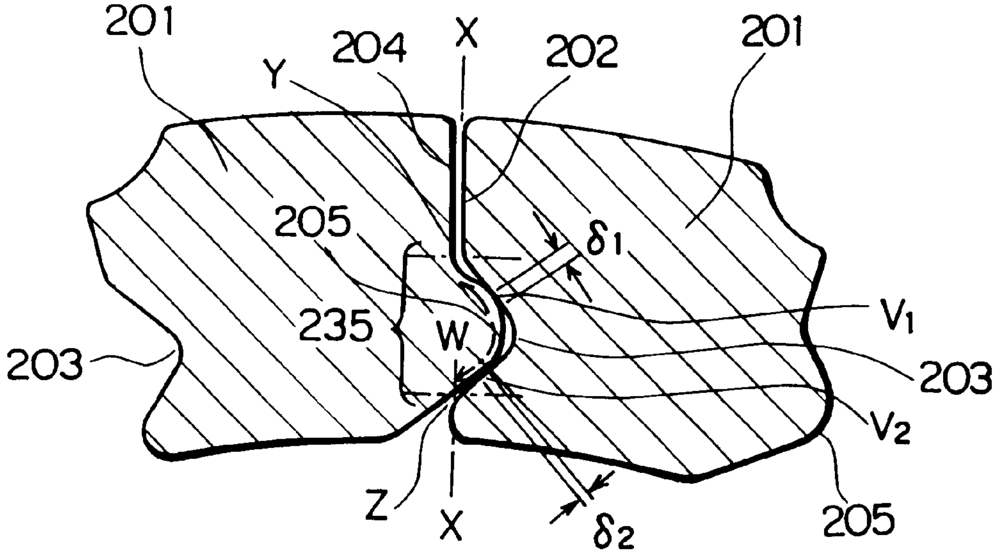
FIG. 24 is a cross-sectional view of a recess-projection mating portion of adjacent segment strands of the twisted segment strand layer according to the present invention.

Next, an explanation will be made of an embodiment of the overhead cable according to a fourth aspect of the present invention based on the drawings. FIG. 22 is a cross-sectional view of an embodiment of the present invention, FIG. 23 is a cross-sectional view showing enlarged a twisted segment strand portion of the outermost layer, and FIG. 24 is a cross-sectional view of a recess-projection mating portion where a recessed portion and a projecting portion provided at the side surfaces of adjacent segment strands mate. As shown in FIG. 22, the overhead cable of this embodiment is formed by twisting around the outer circumference of twisted steel core strands 208 serving as the core for partially bearing the tension nine aluminum strands 209 having a circular cross-section as a first conductive layer, twisting around that outer circumference 15 aluminum strands 209 as a second conductive layer, and further twisting around that outer circumference 24 segment strands 201 having an approximately trapezoidal cross-section to form an outermost layer of an outer diameter D.

Figure 25:
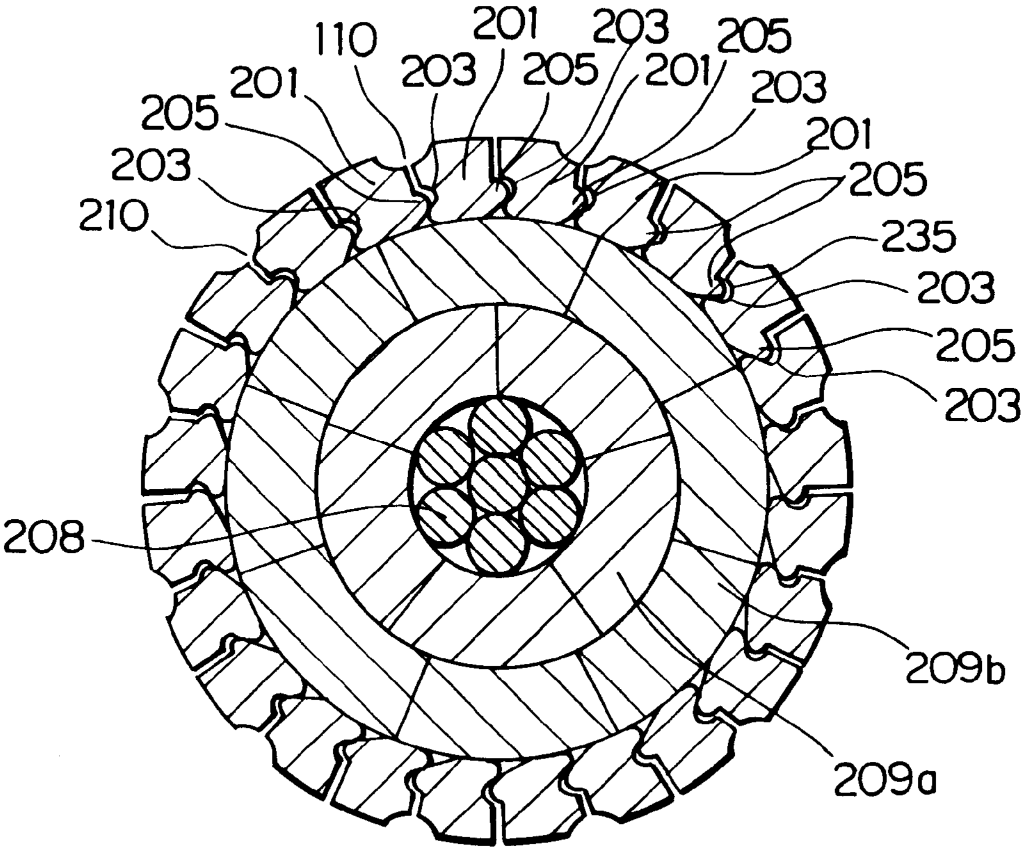
FIG. 25 is a cross-sectional view of another embodiment of the overhead cable according to the present invention.

The segment strands 201 are made of a conductive material such as an aluminum alloy and copper or are strands with a surface of a conductor (for example, aluminum coated steel strands), and the overhead cable of the present invention includes not only power transmission lines, but also overhead ground wires. Note that as the aluminum strands 209, by using the above aluminum strands 209*a*, 209*b* having a sectoral cross-section as shown in FIG. 25 instead aluminum strands having a circular cross-section, it is possible to increase the density of the cross-section and achieve greater compactness and to increase the current-carrying capacity while maintaining an identical outer diameter.

Each of the segment strands 201 is, as shown in FIG. 23, provided at one side surface 202 among a pair of side surfaces facing each other in the cable diametrical direction with a recessed portion 203 of approximately V-shape with a bottom surface having an arc surface continuously in the longitudinal direction of the segment strand 201 and provided at the other side surface 204 with a projecting portion 205 of an approximately V-shape with a top having an arc surface continuously in the longitudinal direction of the segment strand 201. The recessed portion 203 and the projecting portion 205 are formed so that the recessed portion 203 provided on one side surface 202 of one of two adjacent segment strands 201 and the top portion of the projecting portion 205 provided at one side surface 204 of the other segment strand 201 mate with each other when twisting segment strands 201 together to form the outermost layer. By twisting segment strands 201 provided with recessed portions 203 and projecting portions 205 at the two side surfaces together, the adjacent segment strands 201 mate with each other's recessed portions 203 and projecting portions 205, so slippage of the segment strands 201 in the cable diametrical direction is prevented and the effect of preventing strands from sticking out and becoming slack becomes large.

As shown in FIG. 24, at a recess-projection mating portion 235 where the recessed portion 203 and the projecting portion 205 mate with each other, the length of contact U of the surfaces of the recessed portion 203 and the projecting portion 205 in the cable diametrical direction is formed to be not more than 10% of the entire length W1 of the recess-projection mating portion in the cable diametrical direction. Therefore, for example, the radius of curvature R1 of the arc surface of the top arc surface portion 205*a* of the projecting portion 205 (refer to FIG. 23) is formed somewhat larger than the radius of curvature R2 of an arc surface of the bottom arc surface portion 203*a* of the recessed portion 203 (refer to FIG. 23), that is, R1>R2. By making the radius of curvature R1 of the top arc surface portion 205*a* larger than the radius of curvature R2 of the bottom arc surface portion 203*a* in the above way, the length of contact U of the recessed and projecting surfaces in the cable diametrical direction can be suppressed to not more than 10% of the entire length W1 of the recess-projection mating portion 235 in the cable diametrical direction.

In the above overhead cable, the length of contact U of the recessed and projecting surfaces of the recess-projection mating portion in the cable diametrical direction and the entire length W1 of the recess-projection mating portion in the cable diametrical direction indicate the following lengths. Namely, as shown in FIG. 24, at the recess-projection mating portion 235 where the recessed portion 203 of one of the adjoining side surfaces of adjoining segment strands 201 at a twisted segment strand layer at the outermost layer of the cable and the projecting portion 205 of the other mate, the tangential line in the cable diametrical direction at adjoining side surfaces of the adjoining segment strands 201 is defined as the X—X line (chained line in the vertical direction), the rising point at the outer side of the cable (upper side in figure) among the rising points of the recessed portion 203 and the projecting portion 205 rising from the tangential line X—X is made the Y point, the rising point the inner side of the cable (lower side in figure) is made the Z point, and the portion where the recessed portion 203 and the projecting portion 205 mate between the point Y and the point Z is referred to as the recess-projection mating portion 235. The recessed-projecting mating surface of the recess-projection mating portion 235 is an approximate arc-shaped curved surface and not a straight surface, but since it is a curved surface extending in the diametrical direction toward the center of the cable and not in the longitudinal direction of the cable, the length extending of the recess-projection mating portion in the diametrical direction is referred to as the length in the cable diametrical direction. The length of the recessed-projecting fitting surface of the recess-projection mating portion 235 length in the cable diametrical direction is defined as W1, the length of contact of the contact portion V1 of the outer side of the cable (upper portion in the figure) in the cable diametrical direction in the contact surfaces of the surfaces of the recessed portion 203 and the projecting portion 205 at the recess-projection mating portion 235 is defined as δ1, the length of contact of the contact portion V2 of the inner side of the cable (lower portion in the figure) in the cable diametrical direction is defined as δ2, and the length of contact U of the recessed-projecting surfaces of the recess-projection mating portion 235 in the cable diametrical direction is defined as δ1+δ2. Note that a case where either of δ1 or δ2 is "0", namely, a case where the recessed portion 203 and the projecting portion 205 are in contact at only one contact surface portion of the upper portion or the lower portion among the two contact surface portions V1 and V2 of the above recess-projection mating portion, is included as well. The present invention defines the entire length W1 of the recessed-projecting mating surface of the recess-projection mating portion 235 in the cable diametrical direction and the length of contact U of the two recessed-projecting surfaces in the cable diametrical direction and sets the length of contact U of the recessed-projecting surfaces of the recess-projection mating portion 235 in the cable diametrical direction to be not more than 10% of the entire length W1 of the recessed-projecting mating surface in the cable diametrical direction.

The length of contact U at the recess-projection mating portion 235 formed as above is formed in at least one recess-projection mating portion 235 among all of the recess-projection mating portions 235 formed between the adjacent segment strands 201. By setting the length of contact U of the recessed-projecting surfaces in the cable diametrical direction to not more than 10% of the entire length W1 of the recessed-projecting mating surface of the recess-projection mating portion 235 in the cable diametrical direction in this way, the friction between the adjacent segment strands becomes small. As a result, it is possible to obtain flexible twisted strands and to prevent segment strands from receiving too much stress or from suffering from linear scratches, burrs, and the like. Note that when the length of contact U exceeds 10% of the entire length W1, the flexibility of the twisted strands cannot be sufficiently obtained.

Figure 26:
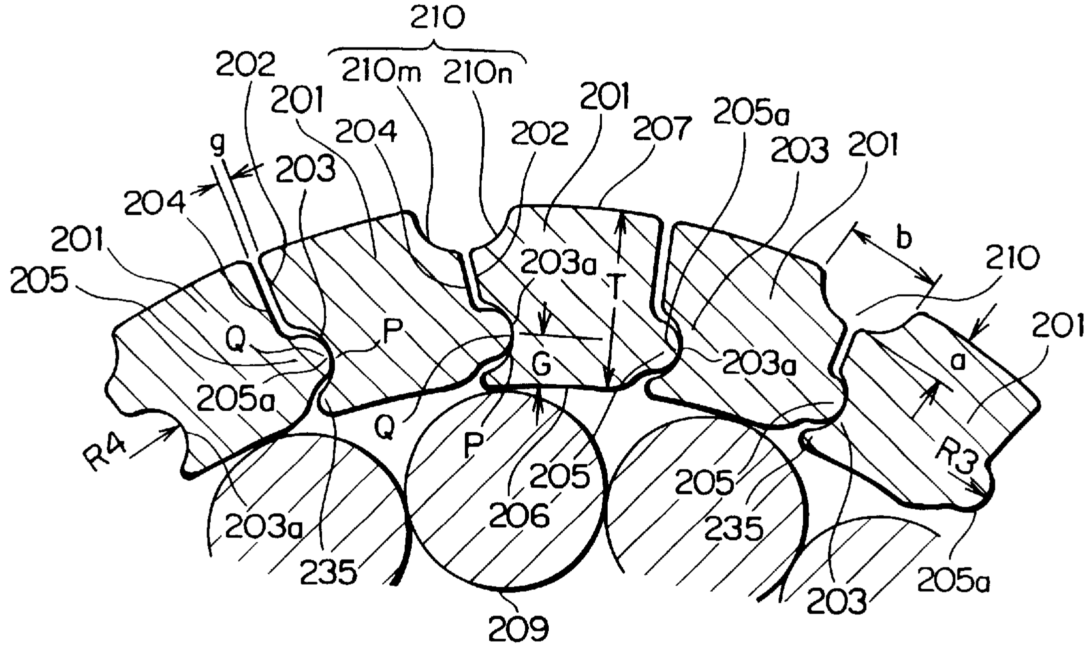
FIG. 26 is a cross-sectional view of another embodiment of the overhead cable according to the present invention.

Also, as shown in FIG. 26, at the recess-projection mating portion 235 where the recessed portion 203 and the projecting portion 205 mate, the radius of curvature R3 of the arc surface of the top arc surface portion 205*a* of the projecting portion 205 is made somewhat smaller than the radius of curvature R4 of the arc surface of the bottom arc surface portion of the recessed portion 203, that is, R3<R4. By making the radius of curvature R3 of the top arc surface portion 205*a* smaller than the radius of curvature R4 of the bottom arc surface portion 203*a*, the length of contact U of the recessed and projecting surfaces in the cable diametrical direction with respect to the entire length W1 of the recess-projection mating portion 235 in the cable diametrical direction can be suppressed to not more than 10%, the top arc surface portion 205*a* of the projecting portion 205 can be positioned at the approximate center portion of the bottom arc surface portion 203*a* of the recessed portion 203, and the twisted segment strands 201 can be prevented from slipping from each other in the cable diametrical direction.

Figure 27:
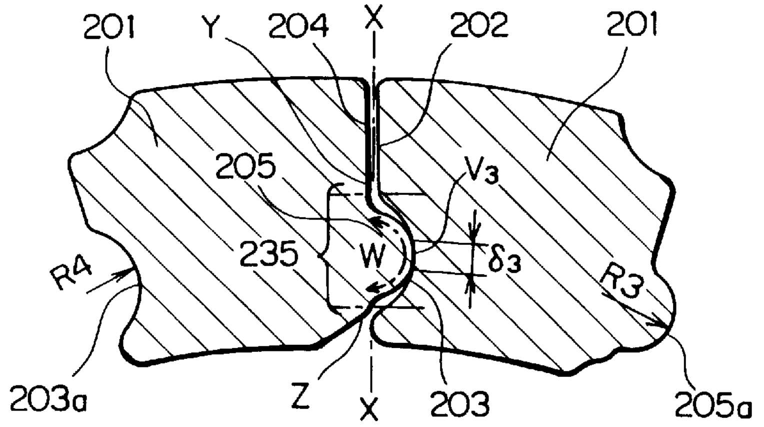
FIG. 27 is a cross-sectional view of a recess-projection mating portion of adjacent segment strands of the twisted segment strand layer of another embodiment according to the present invention.

In the overhead cable in this case, the entire length W1 of the recess-projection mating portion in the cable diametrical direction means the portion where the recessed portion 203 and the projecting portion 205 between the point Y and the point Z mate in the same way as explained above, namely, the length of the recess-projection mating portion 235 extending in the cable diametrical direction. The length of contact U of the recessed and projecting surfaces at the recess-projection mating portion 235 in the cable diametrical direction means the following length. Namely, as shown in FIG. 27, when the length of contact of the contact portion V3 of the region of the center portion Q of the top arc surface portion 205*a* of the projecting portion 205 and the region of the center portion P of the bottom arc surface portion 203*a* of the recessed portion 203 in the cable diameter is δ3, this δ3 corresponds to the length of contact U of the recessed and projecting surfaces in the cable diametrical direction.

The above recessed portion 203 and projecting portion 205 are formed, as shown in FIG. 23 and FIG. 26, so that the distance G from the center portion P of the bottom arc surface portion 203*a* of the recessed portion 203 and center portion Q of the top arc surface portion 205*a* of the projecting portion 205 to the bottom surface 206 of the segment strand 201 becomes in the range of 0.2T≦G≦0.8T with respect to the thickness T of the segment strand 201 (distance from the bottom surface 206 to the outer circumferential surface 207 of the cable). Positioning the center portion P of the bottom arc surface portion 203*a* and the center portion Q of the top arc surface portion 205*a* closer to the direction of the inside bottom surface 206 side of the segment strand 201 than the outer circumferential surface 207 side gives a larger effect of prevention of the strands from sticking out or becoming slack, so the distance G between the point P and the point Q is preferably within the above range. If the center points P and Q are positioned at the cable outer circumferential surface side of the segment strand 201, the twisted segment strands will easily loosen and deform when the cable is bent. This sometimes remains permanently. It becomes difficult to form a smooth cable surface and the problem easily arises that the wind load resistance cannot be reduced.

The surface of the outermost layer formed by the above segment strands 201 are provided at the outer circumferential surface region of the boundary portion where the segment strands 201 adjoin with grooves of a recessed arc shape as shown in the figure to form spiral grooves 210 on the cable outer circumferential surface. The spiral groove 210 is formed by two recessed arc surfaces 210*m*, 210*n* (FIG. 23 and FIG. 26) formed by cutting away the surfaces of the shoulders of the cable outer circumferential sides of the side surfaces of adjoining segment strands 201 into recessed arc shapes. The recessed arc of the groove is formed into a semi-arc shape or shallow arc shape. At least one, preferably a plurality, of spiral grooves 210 are provided on the cable surface at intervals in the circumferential direction. FIG. 22 shows an example of provision of spiral grooves 210 at the outer circumferential surface of every other boundary portion among the boundary portions of the segment strands 201. The spiral grooves 210 may also be provided at the outer circumferential surface of one segment strand 201 instead of being formed at the boundary portions of adjoining segment strands. Also, the cross-sectional shape of the spiral grooves 210 may be that of a groove with a bottom having a rectangular cross-section.

By forming the spiral grooves 210 at the outermost layer in this way, when the wind blows, the air flowing on the cable surface is mixed in the spiral grooves 21 to be made more turbulent. The air flow once breaking away from the cable surface returns to the cable surface at the rear, the breakaway point shifts to the downwind side, the wake flow at the cable downwind side becomes smaller, and the wind load resistance is reduced.

Formation of the size of the above spiral grooves 210 so that when the depth of the recessed groove 210 is a and the width of the opening portion is b, the ratio of the depth a and the width b becomes in the range of $0.05 \leqq a/b \leqq 0.5$, is preferable in terms of the effect of reduction of wind load. If the width b is generally 2 to 10 mm, preferably 5 to 7 mm, the depth a is 0.25 to 0.35 mm or more.

As shown in FIG. 23 and FIG. 26, a space g is formed at the boundary portion where the segment strands 201 forming the outermost layer adjoin each other. The space g is 0.1 to 1.0 mm and is formed at least at one location among a plurality of boundary portions. Due to the space g, even if there is some error in the dimensions of the segment strands 201, no overlayer is formed and the strands do not stick out or become slack.

Figure 28:
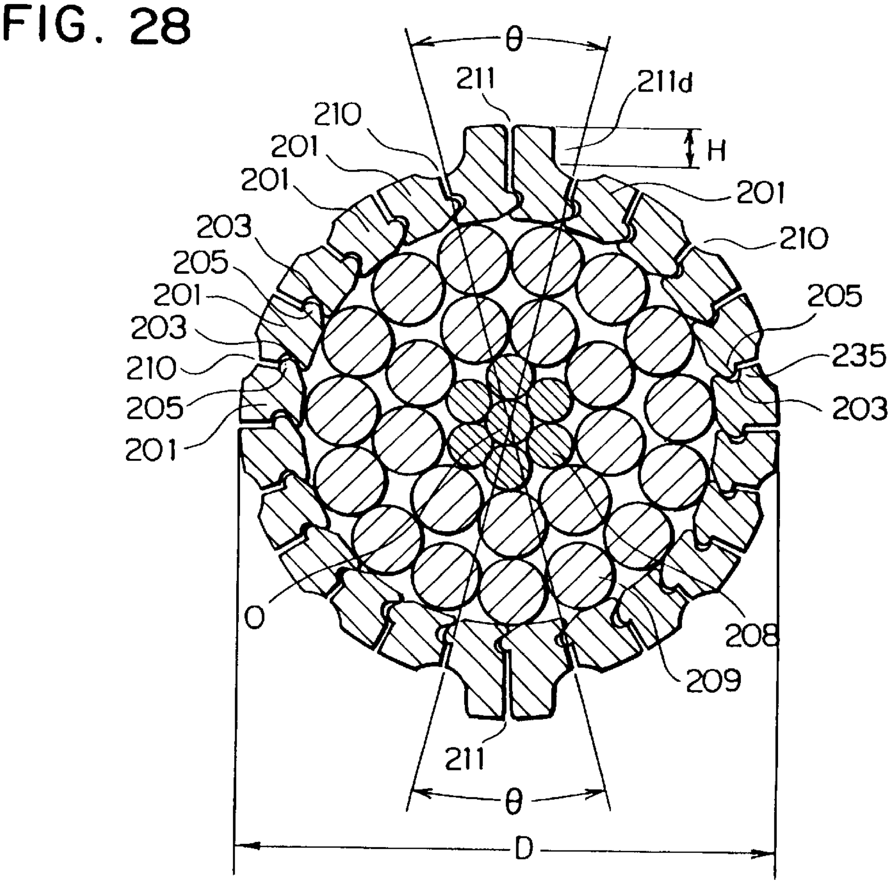
FIG. 28 is a cross-sectional view of another embodiment of the overhead cable according to the present invention.
Figure 29:
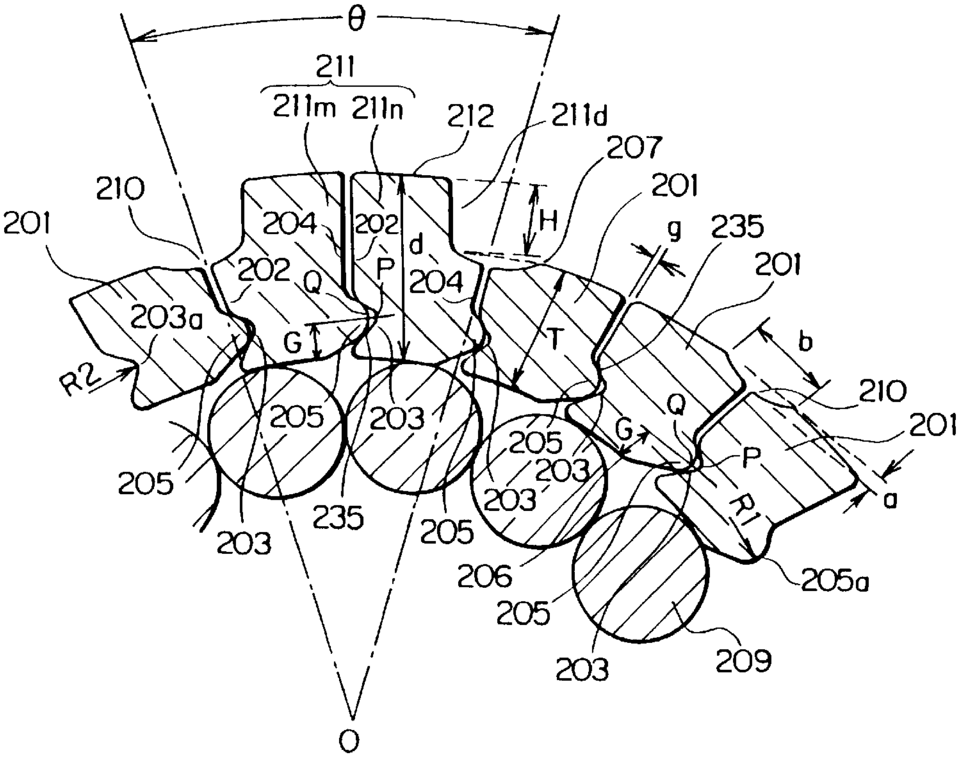
FIG. 29 is an enlarged cross-sectional view of the twisted strand portion of the outermost layer of the embodiment shown in FIG. 28.

FIG. 28 is a cross-sectional view of another embodiment and FIG. 29 is a cross-sectional view showing enlarged the segment strand portion forming the outermost layer, wherein the same reference numerals as those in FIG. 22, FIG. 23, and FIG. 26 indicate the same parts. In the overhead cable in this embodiment, in the same way as in the embodiments shown in FIG. 22, FIG. 23, and FIG. 26, when twisting together the segment strands 201 to form an outermost layer of an outer diameter D, thick segment strands 211 having a larger thickness d in the cable diametrical direction than the thickness T of the segment strand 201 in the cable diametrical direction are twisted between the thin segment strands 201. Half of the thick segment strands 211 of the outer surface side project out from the cable circumferential surface in a spiral form. At least one thick segment strand 211 is twisted. FIG. 28 shows an example of twisting a pair of thick segment strands 211 facing each other on a diametrical line.

The overhead cable of the embodiment is formed by combining as the thick segment strands 211 a pair of left and right thick segment strands 211*m*, 211*n* formed by making thicker two segment strands of the same width as the thin segment strand 201. As shown in FIG. 29, the strands are twisted by mating the recessed portion 203 of the left side surface 202 of the right side thick segment strand 211*n* and the top of the projecting portion 205 of the right side surface 204 of the left side thick segment strand 211*m*, mating the recessed portion 203 of the left side surface 202 of the left side thick segment strand 211*m* and the top of the projecting portion 205 of the thin segment strand 201 adjoining it at the further left side, and mating the top of the projecting portion 205 of the right side surface 204 of the right side thick segment strand 211*n* and the recessed portion 203 of the thin segment strand 201 adjoining it at the further right side. In the same way as in the above embodiment, at the other regions of the outermost layer, the adjoining thin segment strands 201 are twisted together mating the recessed portions 203 and the projecting portions 205.

In the overhead cable of the present embodiment as well, in the same way as in the above embodiment, at least at one recess-projection mating portion 235 among the recess-projection mating portions 235, the radius of curvature R1 of the arc surface of the top arc surface portion 205*a* of the projecting portion 205 is formed somewhat larger than the radius of curvature R2 of the arc surface of the bottom arc surface portion 203*a* of the recessed portion 203, that is, R1>R2, to suppress the length of contact U of the recessed-projecting surfaces of the recess-projection mating portion 235 in the cable diametrical direction to not more than 10% of the entire length W1 of the recess-projection mating portion in the cable diametrical direction.

Note that in the overhead cable of the present embodiment as well, in the same way as in the above embodiment, at least at one recess-projection mating portion 235 among the recess-projection mating portions 235, the radius of curvature R3 of the arc surface of the top arc surface portion 205*a* of the projecting portion 205 is formed somewhat smaller than the radius of curvature R4 of the arc surface of the bottom arc surface portion 203*a* of the recessed portion 203, that is, R3<R4, to suppress the length of contact U of the recessed-projecting surfaces of the recess-projection mating portion 235 in the cable diametrical direction to not more than 10% of the entire length W1 of the recess-projection mating portion in the cable diametrical direction.

The distance G from the center portion P of the bottom arc surface portion 203*a* and center portion Q of the top arc surface portion 205*a* at the thin segment strands 201 to the bottom surface of the thin segment strands 201 is set to the range of $0.2T \leqq G \leqq 0.8T$ (mm) with respect to the thickness T of the thin segment strands 201, and the distance G from the center portion P of the bottom arc surface portion 203*a* and center portion Q of the top arc surface portion 205*a* of the thick segment strands 211 to the bottom surface of the thick segment strands 211 is set to the range of $0.2T \leqq G \leqq 0.8T$ (mm) with respect to the thickness T of the thin segment strands 201.

By twisting the thick segment strands 211 between the thin segment strands 201 together in this way, as shown in FIG. 29, a step difference H is formed between the outer circumferential surface 207 of the thin segment strands 201 and the outer circumferential surface 212 of the thick segment strands 211. The projections 211*d* of the thick segment strands 211 projecting out from the cable circumferential surface by exactly the step difference H form spiral projections projecting out from the circumferential surface of the cable in a spiral form.

The above step difference H is set with respect to the outer diameter D of the outermost layer formed by the thin segment strands 201 so that H/D becomes within the range of $0.01 < H/D < 0.10$. When the step difference H is too small, the effect of noise reduction is lost, while when it is too large, the wind load resistance becomes large and the effect of reduction of the wind load is impaired. According to experiments, the effect of reduction of noise is lost when the step difference H is $H < 0.01D$ and on the other hand $H < 0.1D$ is necessary to obtain an effect of reduction of the wind load to 10 to 20% down from the wind load resistance of a cable of the related art having the same outer diameter. Note that it is possible to provide the above step difference H at four facing positions at the cable circumferential surface to reduce the wind load and reduce the noise reduction even lower.

The width between the two surfaces of the above thick segment strand 211 (in FIG. 29, the width between the right side surface 204 of the right side thick segment strand 211*m* and the left side surface 202 of the left side thick segment strand 211*n*) is set so that the center angle θ between the two side surfaces of a strand at the center O of the cable becomes within the range of $10° < \theta < 90°$. If the center angle θ is less than 10°, a karman vortex is easily formed in the downwind side of the cable, the effect of reduction of the noise is impaired, and the thick segment strands 211 twisted at the outermost layer projecting out in a spiral on the cable circumferential surface are knocked down and the projections 211*d* are easily crushed and deformed when the cable is passed through pulleys when laying the cable, therefore the center angle θ is preferably more than 10°. Also, when the center angle θ exceeds 90°, the projected cross-sectional area is increased, the wind load resistance increases, and the effect of reduction of the wind load is impaired, therefore the center angle θ is preferably not more than 90°. by adopting this configuration, the corona noise level can also be suppressed to a sufficiently low value.

In the overhead cable of the present embodiment as well, in the same way as in the above embodiment, the outer circumferential surface, that is, the outermost layer, is provided with spiral grooves 210 as grooves recessed in an arc shape. A plurality of, or at least one of, such spiral grooves 210 are formed at intervals in the cable circumferential direction. The thick segment strands 211 adjacent to the thin segment strands 201, as shown in FIG. 26, are formed with recessed arc surfaces at the segment shoulders of the bottom edges of the projections 211*d* of the thick segment strands 211 to form grooves having arc surfaces together with the recessed arc surfaces of the adjoining thin segment strands 201. In the overhead cable of this embodiment as well, by forming the spiral grooves at the cable outer circumferential surface, the laminar flow along the cable surface passes through the spiral grooves 210 and shifts to the downwind side when the wind blows, the breakaway point shifts to the downwind side, the drag coefficient becomes small, and the wind load resistance is reduced.

Further, in the overhead cable of this embodiment as well, the ratio of the depth a and the width b of the spiral groove 210 is made within the range of $0.05 \leqq a/b \leqq 0.5$ and a space g of 0.1 to 1.0 mm is formed at least at one location of the boundary portions of the thin segment strands 201.

Figure 30:
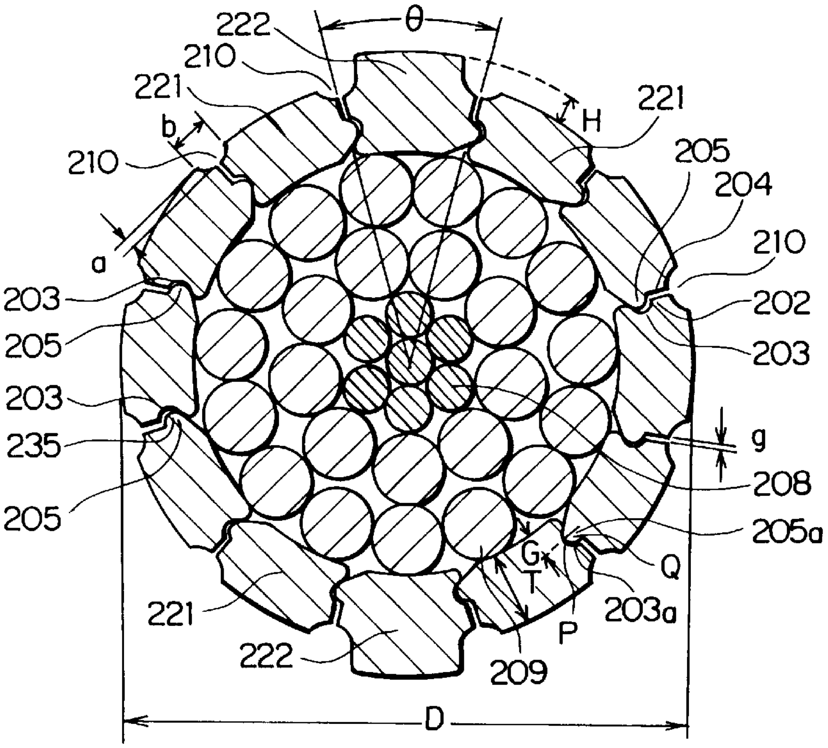
FIG. 30 is a cross-sectional view of still another embodiment according to the present invention.

FIG. 30 is a cross-sectional view of still another embodiment, wherein the same reference numerals as in FIG. 22, FIG. 23, FIG. 26, FIG. 28, and FIG. 29 indicate the same parts. The overhead cable of this embodiment uses segment strands 221, 222 having a width of two segment strands in the above embodiment and twists 10 thin segment strands 221 and two thick segment strands 222 to give an outer diameter D of the outermost layer demarcated by the thin segment strands 221 and give two thick segment strands 222 facing each other on a diametrical line. Also, grooves having a recessed arc shape are provided for every outer circumferential surface region of the boundary portions where the segment strands adjoin each other to form the spiral grooves 210 at intervals in the circumferential direction of the outer circumferential surface of the cable.

At least at one recess-projection mating portion 235 among the recess-projection mating portions 235 of the segment strands, the radius of curvature R1 of the arc surface of the top arc surface portion 205*a* of the projecting portion 205 is formed somewhat larger than the radius of curvature R2 of the arc surface of the bottom arc surface portion 203*a* of the recessed portion 203, that is, $R1>R2$, to suppress the length of contact U of the recessed-projecting surfaces of the recess-projection mating portion 235 in the cable diametrical direction to not more than 10% of the entire length W1 of the recess-projection mating portion in the cable diametrical direction.

Note that at least at one recess-projection mating portion 235 among the recess-projection mating portions 235 of the segment strands, the radius of curvature R3 of the arc surface of the top arc surface portion 205*a* of the projecting portion 205 is formed somewhat smaller than the radius of curvature R4 of the arc surface of the bottom arc surface portion 203*a* of the recessed portion 203, that is, $R3<R4$, to suppress the length of contact U of the recessed-projecting surfaces of the recess-projection mating portion 235 in the cable diametrical direction to not more than 10% of the entire length W1 of the recess-projection mating portion in the cable diametrical direction.

Further, the strands are twisted by mating the recessed portions 203 on the side surface of the thin segment strands 201 and the projecting portions 205 of the side surface of the adjacent thin segment. The center portions P of the bottom arc surface portions 203*a* of the recessed portions 203 and the center portions Q of the top arc surface portions 205*a* of the projecting portions 205 are positioned in the range of $0.2T \leqq G \leqq 0.8T$ (mm) with respect to the thickness T of the thin segment strands 201.

Also, as shown in FIG. 30, the center angle θ of the thick segment strands 222 is made in the range of $10° < \theta < 90°$, the step difference H between the outer circumferential surface of the thin segment strands 221 and the outer circumferential surface of the thick segment strands 222 is set to a range of $0.05 \leqq H/D \leqq 0.10$ with respect to the outer diameter D of the outermost layer demarcated by the thin segment strands 221, the ratio of the depth a and the width b of the spiral grooves 210 is made a range of $0.05 \leqq a/b \leqq 0.5$, and a space g of 0.1 to 1.0 mm is formed at least at one location of the boundary portions where the segment strands 201 adjoin each other.

In the cable of the related art, the drag coefficient becomes maximum around the wind speed of 20 m/s, the drag coefficient then increases somewhat when the wind speed rises, and the drag coefficient becomes substantially 1 at 80 m/s. On the other hand, in the cable of the present invention, the spiral grooves 210 provided at the cable surface make the air flow turbulent, reduce the wake flow at the downwind side, and remarkably reduces the wind load resistance. At the wind speed of 20 m/s, the turbulence action in the spiral grooves 210 cannot be exhibited much, but with a wind speed of 25 m/s or more, the turbulence action in the spiral grooves 210 causes the wind load resistance is dramatically reduced and is sustained even at a wind speed of 80 m/s. In the cable of the present invention, the wind load resistance is tremendously reduced, the construction costs for steel towers, foundations, etc. can be reduced, and therefore the economic effect is remarkable.

As in the above embodiment, even with a cable having a step difference H of spiral projections on the outer circumference, by selecting an appropriate value of the ratio H/D of the step difference H with respect to the cable outer diameter D to be within the range of $0.01 < H/D < 0.10$, there is an effect of reduction of the drag coefficient in the range of high wind speed of 30 to 40 m/s of at least 20% better than a cable of the related art. As to the shape of the spiral grooves 210 formed on the cable surface, it is also found that by selecting the ratio of the depth a and the width b of the groove to be within the predetermined range of $0.05 \leqq a/b \leqq 0.5$, the optimal drag coefficient for a desired design wind speed can be selected. Also, by selecting the number of the spiral grooves 210 to be within the predetermined range, the optimal drag coefficient can be selected.

Figure 31:
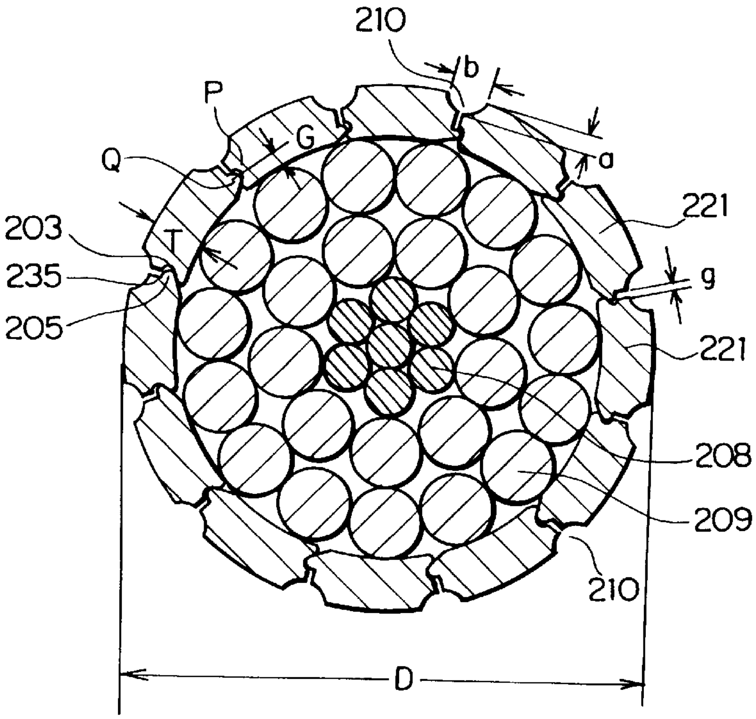
FIG. 31 is a cross-sectional view of still another embodiment of the overhead cable according to the present invention.

FIG. 31 is a cross-sectional view of another embodiment, wherein the same reference numerals as those in FIG. 22, FIG. 23, and FIG. 26 indicate the same parts. In the overhead cable of the present embodiment, the outermost layer is formed by twisting together segment strands 221 having a width of two segment strands 201 in the above embodiment, the arc surfaces of the recessed portions 203 and the projecting portions 205 provided at the side surfaces of the segment strands 221 are formed to have a larger curvature than the recessed portions 203 and the projecting portions 205 of the segment strands 201 in the above embodiment, 12 segment strands 221 are twisted together to form a cable of the outer diameter D, grooves of a recessed arc shape are provided for each of the outer circumferential surface regions of the boundary portions where the segment strands 221 adjoin each other, and spiral grooves 210 are formed at intervals in the circumferential direction on the outer circumferential surface of the cable.

In the present embodiment as well, at least at one recess-projection mating portion 235 among the recess-projection mating portions 235, the radius of curvature R1 of the arc surface of the top arc surface portion 205*a* of the projecting portion 205 is formed somewhat larger than the radius of curvature R2 of the arc surface of the bottom arc surface portion 203*a* of the recessed portion 203, that is, R1>R2, to suppress the length of contact U of the recessed-projecting surfaces in the cable diametrical direction to not more than 10% of the entire length W1 of the recess-projection mating portion in the cable diametrical direction. Further, the distance G from the center portion P of the bottom arc surface portion 203*a* of the recessed portions 203 and center portion Q of the top arc surface portion 205*a* of the projecting portions 205 to the bottom surface of the segment strands 221 is set to the range of $0.2T \leqq G \leqq 0.8T$ (mm) with respect to the thickness T between the bottom surface and the outer circumferential surface, a space g of 0.1 to 1.0 mm is formed at least at one location of the boundary portions where the segment strands 100 adjoin each other, and the depth a and the width b of the spiral grooves 210 is formed to $0.05 \leqq a/b \leqq 0.5$.

Note that in this embodiment, at least at one recess-projection mating portion 235 among the recess-projection mating portions 235, to suppress the length of contact U of the recessed-projecting surfaces of the recess-projection mating portion 235 in the cable diametrical direction to not more than 10% of the entire length W1 of the recess-projection mating portion in the cable diametrical direction, the radius of curvature R3 of the arc surface of the top arc surface portion 205*a* of the projecting portion 205 is formed somewhat smaller than the radius of curvature R4 of the arc surface of the bottom arc surface portion 203*a* of the recessed portion 203, that is, R3<R4.

Figure 32:
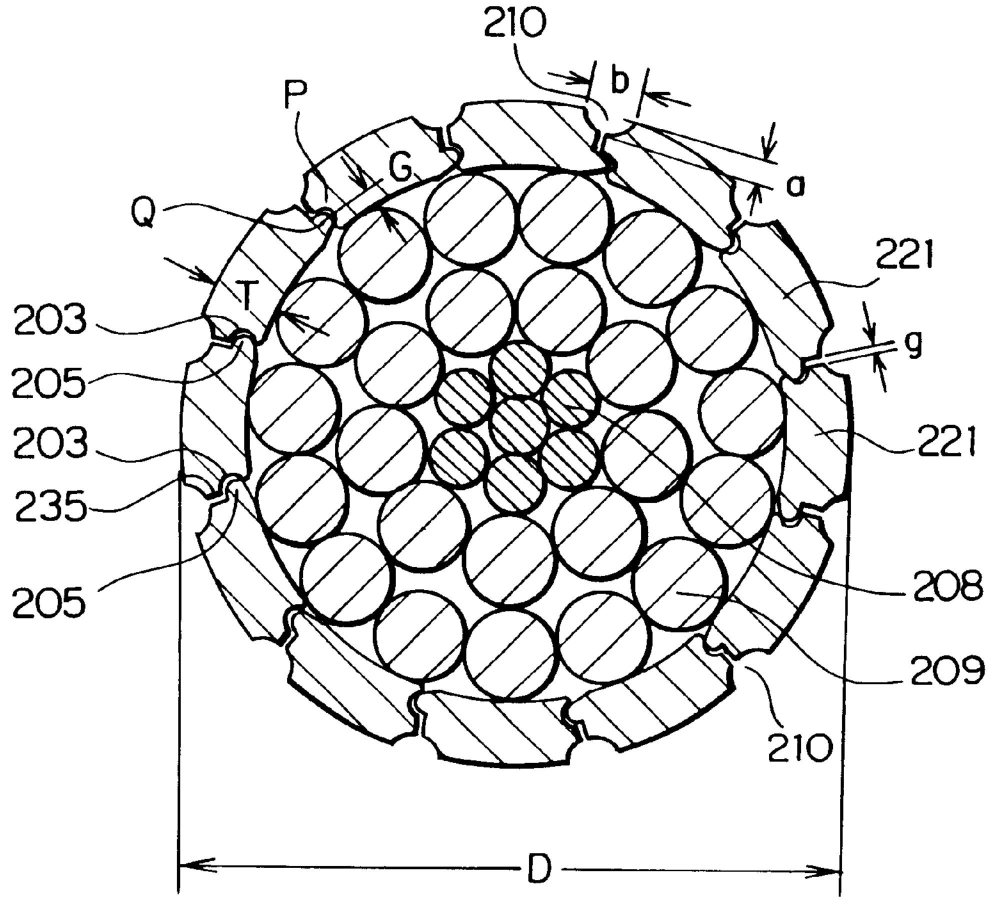
FIG. 32 is a cross-sectional view of still another embodiment of the overhead cable according to the present invention.

FIG. 32 is a cross-sectional view of still another embodiment, wherein the same reference numerals as those in FIG. 22, FIG. 23, and FIG. 26 show the same parts. In the same way as in the above embodiment, in the overhead cable of the present embodiment, the outermost layer is formed by twisting segment strands 221 having a wide width and the recessed portions 203 and the projecting portions 205 provided at the side surfaces of the segment strands 221 forming the outermost layer are formed as recessed portions 203 and projecting portions 205 of a semi-arc shape. Also, at least at one recess-projection mating portion 235 among the recess-projection mating portions 235 of the segment strands 221, to make the length of contact U of the recessed-projecting surfaces in the cable diametrical direction not more than 10% of the entire length W1 of the recess-projection mating portion in the cable diametrical direction, the radius of curvature R1 of the arc surface of the top arc surface portion 205*a* of the projecting portion 205 is formed to be somewhat larger than the radius of curvature R2 of the arc surface of the bottom arc surface portion 203*a* of the recessed portion 203, that is, R1>R2, the distance G from the center portions P of the bottom arc surface portions 203*a* of the recessed portions 203 and the center portions Q of the top arc surface portions 205*a* of the projecting portions 205 to the bottom surfaces of the segment strands 221 is set to $0.2T \leqq G \leqq 0.8T$ (mm) with respect to the thickness T between the bottom surface and the outer circumferential surface, a space g of 0.1 to 1.0 mm is formed at least at one location of the boundary portions where the segment strands 221 adjoin each other, and the depth a and the width b of the spiral grooves 210 is formed to be $0.05 \leqq a/b \leqq 0.5$.

Note that in the present embodiment, at least at one recess-projection mating portion 235 among the recess-projection mating portions 235, to suppress the length of contact U of the recessed-projecting surfaces in the cable diametrical direction to not more than 10% of the entire length W1 of the recess-projection mating portion in the cable diametrical direction, the radius of curvature R3 of the arc surface of the top arc surface portion 205*a* of the projecting portion 205 may also be formed somewhat smaller than the radius of curvature R4 of the arc surface of the bottom arc surface portion 203*a* of the recessed portion 203, that is, R3<R4.

Figure 33:
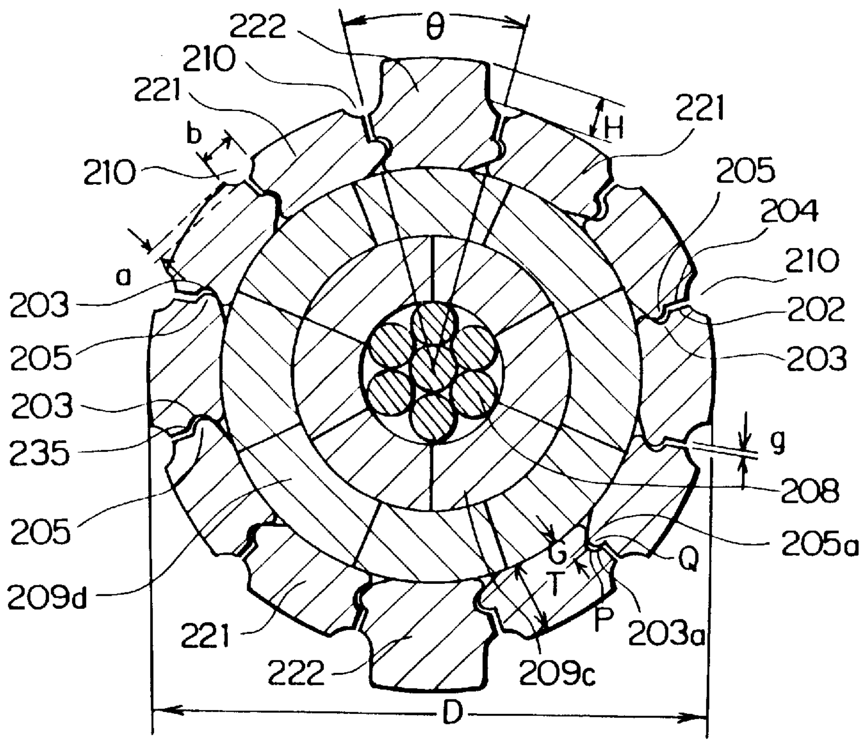
FIG. 33 is a cross-sectional view of still another embodiment of the overhead cable according to the present invention.
Figure 34:
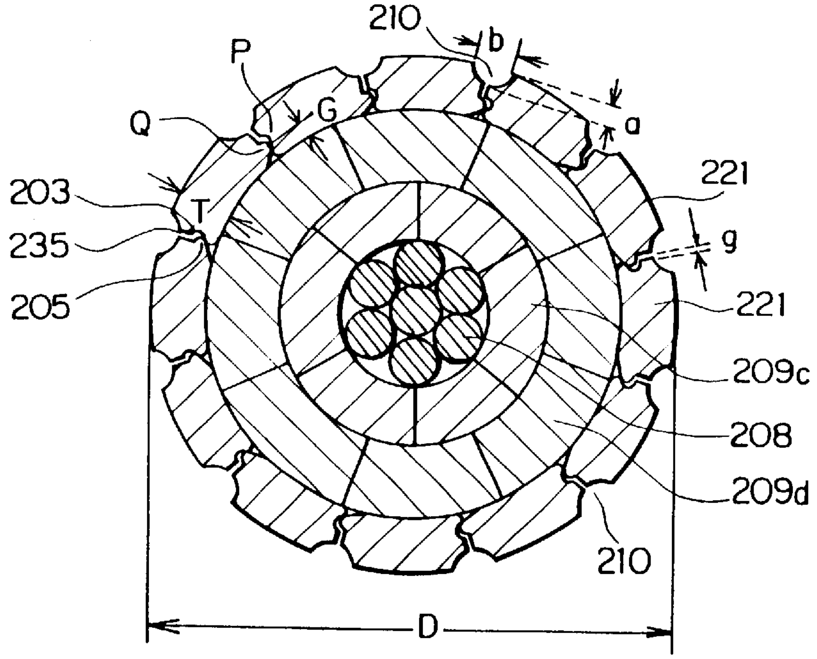
FIG. 34 is a cross-sectional view of still another embodiment of the overhead cable according to the present invention.

FIG. 33 and FIG. 34 are cross-sectional views of another embodiment in which the conductive layers in the embodiment shown in FIGS. 30 and 31 are modified. The same reference numerals as those in FIG. 30 and FIG. 31 indicate the same parts. Namely, the overhead cables of both of the embodiments are formed by twisting around the outer circumference of twisted steel core strands serving as a core for partially bearing the tension six aluminum segment strands 209*c* having an approximate sectoral cross-section as a first conductive layer, twisting around the outer circumference eight aluminum segment strands 209*d* as a second conductive layer, and further twisting around that outer circumference 12 segment strands 221, 222 to form outermost layers having an outer diameter D. By using the segment strands 209*c*, 209*d* having a sectoral cross-section in this way, it is possible to increase the density of the cross-section and achieve greater compactness and to increase the current-carrying capacity while maintaining an identical outer diameter.

Note that the cables in the embodiments shown in FIG. 22 to FIG. 34 were shown as ones with a structure of four twisted layers, but the number of twisted layers can be changed in accordance with the size of the cable.

According to the overhead cable of the above fourth aspect of the present invention, since the recessed portions and the projecting portions are provided at the two side surfaces of the segment strands and the recessed and projecting portions of the adjacent segment strands are mated with each other when twisting to form the outermost layer and since the length of contact of the recessed-projecting surfaces at least at one recess-projection mating portion among the plurality of recess-projection mating portions obtained at this time in the cable diametrical direction to not more than 10% of the entire length W1 of the recess-projection mating portion in the cable diametrical direction, the friction between adjoining segment strands becomes small, pliable twisted strands can be obtained, handling becomes easy, no excessive stress is applied to the segment strands, there is no cracking like in the past, no slippage of the strands at the time of twisting such as in the related art occurs, and the strands can be prevented from sticking out and becoming slack when passing the cable through the pulleys when laying the cable.

Also, since the outer circumferential surface of the outermost layer formed by twisting together the segment strands is provided with at least one or a plurality of spiral grooves at intervals in the cable circumferential direction, the breakaway point of the boundary layer flowing along the cable surface when the wind blows on the overhead cable shifts to the downwind side of the cable and the wind load is reduced.

Further, by making the radius of curvature of the top arc surface portion of the projecting portion provided at the side surface of the segment strands larger than the radius of curvature of the bottom arc surface portion of the recessed portion, the length of contact of the recessed and projecting surfaces of the recess-projection mating portion of adjacent segment strands in the cable diametrical direction can be suppressed to not more than 10% of the entire length W1 of the recess-projection mating portion in the cable diametrical direction.

By making the radius of curvature of the top arc surface portion of the projecting portion provided at the side surface of the segment strands smaller than the radius of curvature of the bottom arc surface portion of the recessed portion, the length of contact of the recessed and projecting surfaces of the recess-projection mating portion of adjacent segment strands in the cable diametrical direction can be suppressed to not more than 10% of the entire length of the recess-projection mating portion in the cable diametrical direction. Further, the top arc surface portion of the projecting portion may be positioned at the approximate center portion of the bottom arc surface portion of the recessed portion, and it is possible to prevent the twisted segment strands from slipping in the cable diametrical direction.

Also, since the distance G from the center portion of the bottom arc surface portion of the recessed portion and the center portion of the top arc surface portion of the projecting portion at the two side surfaces of the segment strands to the bottom surface of the segment strands is set to satisfy $0.2T \leqq G \leqq 0.8T$ (mm) with respect to the thickness T between the bottom surface and the outer circumferential surface of the segment strands, the effect of preventing the segment strands from sticking out or becoming slack due to their slipping in the cable diametrical direction when twisting the segment strands together to form the outermost layer becomes large.

Also, by forming a space of 0.1 to 1.0 mm at least at one location of the boundary portions where the segment strands adjoin each other, even if there is some error in the dimensions of the segment strands, the error can be absorbed and adjusted by the above space, so the recessed portions and the projecting portions can be mated without any difficulties. Also, rain water entering inside the cable can be quickly discharged by the space.

Also, by setting the depth a and the width b of the spiral grooves formed on the outer circumferential surface of the outermost layer formed by the segment strands $0.05<a/b<0.5$, the optimum drag coefficient Cd can be selected for a desired design wind speed and the effect of reduction of the wind load can be increased.

Further, by forming the outermost layer by twisting together at least one thick segment strand between thin segment strands, forming a step difference H between the outer circumferential surface of the thin segment strands and the outer circumferential surface of the thick segment strands, and making the step difference H $0.01<H/D<0.10$ with respect to the outer diameter D of the outermost layer demarcated by the thin segment strands, a low wind noise and low corona noise cable having large effect of reduction of the wind load can be obtained.

Furthermore, by making the center angle θ of the thick segment strands $10°<\theta<90°$, not only are a large effect of reduction of the wind load and effect of reduction of the noise obtained, but also it is possible to prevent the thick segment strands from being knocked down and the projections from being crushed or deformed when passing the cable through pulleys when laying the cable.

INDUSTRIAL APPLICABILITY

As explained above, the overhead cable of the present invention can reduce the wind load resistance, the wind noise, and the corona noise while preventing strands forming the outermost layer from sticking out and becoming slack, therefore is useful when laid as an overhead cable under a high wind speed environment.

What is claimed is:

1. An overhead cable comprising:

a tension-bearing core;

a conductive layer provided at the outer circumference of said core; and an outermost layer formed by twisting together a plurality of segment strands at the outer circumference of said conductive layer, said outermost layer formed by the plurality of segment strands having at a part of an outer circumferential surface of said segment strands or outer circumferential surface regions where said segment strands are twisted together to adjoin each other at either one groove or a plurality of grooves that form a spiral shape along an outer surface of said outermost layer, each groove including a first surface opposite from and substantially parallel to a second surface and a bottom portion with a rectangular cross-section formed there between at intervals in the circumferential direction of the overhead cable, wherein at least one of said plurality of spiral grooves is formed to satisfy the following condition $$1<W/h<16$$

where a width and a depth of the cross-section are W and h.

2. An overhead cable as set forth in claim 1, wherein at least one of said plurality of spiral grooves has at the two edge portions chamfers of a gradient of 10% or less or chamfers of a radius of curvature of ½ or less of a diameter D of said overhead cable.

3. An overhead cable as set forth in claim 1, wherein said conductive layer comprises one or a plurality of layers.

4. An overhead cable as set forth in claim 1, wherein said conductive layer comprises a plurality of segment strands twisted together and said segment strands have circular cross-sections or substantially trapezoidal cross-sections.

5. An overhead cable comprising:

a tension-bearing core;

a conductive layer formed at the outer circumference of said core; and an outermost layer formed by twisting together a plurality of segment strands at an outer circumference of said conductive layer, said segment strands forming the outermost layer including thin segment strands and at least one thick segment strand and the following condition being satisfied:

$0.01<H/D<0.10$ and $10° < \theta < 90°$ where a step difference between an outer circumferential surface of said thin segment strands and an outer circumferential surface of said thick segment strands in the state where they are twisted together to form the outermost layer is H, a center angle of said thick segment strands is θ, and an outer diameter of the overhead cable demarcated by said thin segment strands is D, wherein said outermost layer formed by said plurality of segment strands has at a part of an outer circumferential surface of said segment strands or outer circumferential surface regions of boundary portions where said segment strands are twisted together to adjoin each other at either one groove or a plurality of grooves that form a spiral shape along an outer surface of said outermost layer, each groove including a first surface opposite from and substantially parallel to a second surface and a bottom portion with a rectangular cross-section formed there between at intervals in the circumferential direction of the overhead cable, wherein said outermost layer formed by said plurality of segment strands has at a part of an outer circumferential surface of said segment strands or outer circumferential surface regions of boundary portions where said segment strands are twisted together to adjoin each other at either one groove or a plurality of grooves that form a spiral shape along an outer surface of said outermost layer, each groove including a first surface opposite from and substantially parallel to a second surface and a bottom portion with a rectangular cross-section formed there between at intervals in the circumferential direction of the overhead cable and said spiral grooves are formed to satisfy $1 < W/h < 16$ where a width and a depth of said cross-section are W and h.

6. An overhead cable as set forth in claim 5, wherein said conductive layer comprises one layer or a plurality of layers.

7. An overhead cable as set forth in claim 5, wherein said conductive layer comprises a plurality of segment strands twisted together and said segment strands have circular cross-sections or substantially trapezoidal cross-sections.

8. An overhead cable comprising:

a tension-bearing core;

a conductive layer formed at the outer circumference of said core; and an outermost layer formed by twisting together a plurality of segment strands at an outer circumference of said conductive layer, said segment strands forming the outermost layer including thin segment strands and at least one thick segment strand and the following condition being satisfied:

$0.01 < H/D < 0.10$ and $10° < \theta < 90°$ where a step difference between an outer circumferential surface of said thin segment strands and an outer circumferential surface of said thick segment strands in the state where they are twisted together to form the outermost layer is H, a center angle of said thick segment strands is θ, and an outer diameter of the overhead cable demarcated by said thin segment strands is D, wherein said outermost layer formed by said plurality of segment strands has at a part of an outer circumferential surface of said segment strands or outer circumferential surface regions of boundary portions where said segment strands are twisted together to adjoin each other at either one groove or a plurality of grooves that form a spiral shape along an outer surface of said outermost layer, each groove including a first surface opposite from and substantially parallel to a second surface and a bottom portion with a rectangular cross-section formed there between at intervals in the circumferential direction of the overhead cable, wherein said outermost layer formed by said plurality of segment strands has at a part of an outer circumferential surface of said segment strands or outer circumferential surface regions of boundary portions where said segment strands are twisted together to adjoin each other at either one groove or a plurality of grooves that form a spiral shape along an outer surface of said outermost layer, each groove including bottom portion with a rectangular cross-section formed there between at intervals in the circumferential direction of the overhead cable and said spiral grooves have at their two edge portions a chamfer of a gradient of 10% or less or a chamfer of a radius of curvature of ½ or less of a diameter of said overhead cable.

9. An overhead cable as set forth in claim 9, wherein said conductive layer comprises one layer or a plurality of layers.

10. An overhead cable as set forth in claim 9, wherein said conductive layer comprises a plurality of segment strands twisted together and said segment strands have circular cross-sections or substantially trapezoidal cross-sections.

11. An overhead cable comprising:

a tension-bearing core;

a conductive layer provided at an outer circumference of said core; and an outermost layer formed by twisting a plurality of segment strands at an outer circumference of said conductive layer, each of said plurality of segment strands forming the outermost layer having a recessed portion formed at one side surface among a pair of side surfaces facing each other in a circumferential direction of the overhead cable and a projecting portion formed at the other side surface so as to mate with an adjacent segment strand in the twisted state, wherein the following condition is satisfied:

$0.2T \leqq G \leqq 0.8T$ (mm)

where the distance from a center portion of a bottom of the recessed portion and a center portion of a top of said projecting portion to a bottom surface of said segment strands is G and a thickness from a bottom surface to a circumferential surface of said segment strand is T.

12. An overhead cable as set forth in claim 11, wherein said outermost layer formed by said plurality of segment strands has at a part of an outer circumferential surface of said segment strands or outer circumferential surface regions of boundary portions where said segment strands are twisted together and adjoin each other at least one or a plurality of spiral grooves with recessed cross-sections formed at intervals in the circumferential direction of the overhead cable.

13. An overhead cable as set forth in claim 11, wherein a space of 0.1 to 1.0 mm is provided at least at one location of boundary portions where a plurality of segment strands are twisted together to adjoin each other.

14. An overhead cable as set forth in claim 11, wherein said outermost layer formed by said plurality of segment strands has at a part of an outer circumferential surface of said segment strands or outer circumferential surface regions of boundary portions where said segment strands are twisted together and adjoin each other at least one or a plurality of spiral grooves with recessed cross-sections formed at intervals in the circumferential direction of the overhead cable and said spiral grooves satisfy $0.05 \leqq a/b \leqq 0.5$ where a depth thereof is a and a width at an opening portion thereof is b.

15. An overhead cable as set forth in claim 11, wherein:

said segment strands forming said outermost layer include thin segment strands and at least one thick segment strand and the following conditions are satisfied:

$0.01 < H/D < 0.10$ and $10° < \theta < 90°$ where a step difference between an outer circumferential surface of said thin segment strands and an outer circumferential surface of said thick segment strands in the state where they are twisted together to form the outermost layer is H, a center angle of said thick segment strands is θ, and an outer diameter of the overhead cable demarcated by said thin segment strands is D.

16. An overhead cable as set forth in claim 11, wherein said conductive layer comprises one layer or a plurality of layers.

17. An overhead cable as set forth in claim 11, wherein said conductive layer comprises a plurality of segment strands twisted together and said segment strands have circular cross-sections or substantially trapezoidal cross-sections.

18. An overhead cable comprising:

a tension-bearing core;

a conductive layer provided at an outer circumference of said core; and an outermost layer formed by twisting together a plurality of segment strands at an outer circumference of said conductive layer, each of said plurality of segment strands forming the outermost layer having a recessed portion formed at one side surface among a pair of side surfaces facing each other in a circumferential direction of the overhead cable and a projecting portion formed at the other side surface so as to mate with an adjacent segment strand in the twisted state and a length of contact in an overhead cable diametrical direction of recessed and projecting surfaces of at least one recess-projection mating portion among a plurality of recess-projection mating portions in a state where the projecting portions are mated with the recessed portions being made not more than 10% of an entire length in said diametrical direction of said recess-projection mating portion, wherein said projecting portion has a top arc surface portion where the top forms an arc surface of a radius of curvature R1, said recessed portion has a bottom arc surface portion where the bottom forms an arc surface of a radius of curvature R2, and said radius of curvature R1 and said radius of curvature R2 satisfy R1>R2.

19. An overhead cable as set forth in claim 18, wherein said outermost layer formed by said plurality of segment strands has at a part of an outer circumferential surface of said segment strands or outer circumferential surface regions of boundary portions where said segment strands are twisted together and adjoin each other at least one or a plurality of spiral grooves with recessed cross-sections formed at intervals in the circumferential direction of the overhead cable.

20. An overhead cable as set forth in claim 18, wherein said projecting portion has a top arc surface portion where the top forms an arc surface of a radius of curvature R3, said recessed portion has a bottom arc surface portion where the bottom forms an arc surface of a radius of curvature R4, and said radius of curvature R3 and said radius of curvature R4 satisfy R3<R4.

21. An overhead cable as set forth in claim 18, wherein:

said projecting portion has a top arc surface portion forming an arc surface at a top and said recessed portion has a bottom arc surface portion forming an arc surface at a bottom and the following condition is satisfied:

$0.2T \leqq G \leqq 0.8T$ (mm)

where a distance from a center portion of said bottom arc surface portion and a center portion of said top arc surface portion to a bottom surface of said segment strand is G and a thickness from a bottom surface to a circumferential surface of said segment strand is T.

22. An overhead cable as set forth in claim 18, wherein a space of 0.1 to 1.0 mm is provided at least at one location of boundary portions where a plurality of segment strands are twisted together to adjoin each other.

23. An overhead cable as set forth in claim 18, wherein:

said outermost layer formed by said plurality of segment strands has at a part of an outer circumferential surface of said segment strands or outer circumferential surface regions of boundary portions where said segment strands are twisted together and adjoin each other at least one or a plurality of spiral grooves with recessed cross-sections formed at intervals in the circumferential direction of the overhead cable and said spiral grooves satisfy $0.05 \leqq a/b \leqq 0.5$ where a depth thereof is a and a width at an opening portion thereof is b.

24. An overhead cable as set forth in claim 20, wherein:

said segment strands forming said outermost layer include thin segment strands and at least one thick segment strand and the following conditions are satisfied:

$0.01 < H/D < 0.10$ and $10° < \theta < 90°$ where a step difference between an outer circumferential surface of said thin segment strands and an outer circumferential surface of said thick segment strands in the state where they are twisted together to form the outermost layer is H, a center angle of said thick segment strands is θ, and an outer diameter of the overhead cable demarcated by said thin segment strands is D.

25. An overhead cable as set forth in claim 18, wherein said conductive layer comprises one layer or a plurality of layers.

26. An overhead cable as set forth in claim 18, wherein said conductive layer comprises a plurality of segment strands twisted together and said segment strands have circular cross-sections or substantially trapezoidal cross-sections.

* * * * *